United States Patent
Daniels et al.

(10) Patent No.: US 12,459,674 B2
(45) Date of Patent: Nov. 4, 2025

(54) INFLATABLE STRUCTURES OF OR FOR SPACECRAFT

(71) Applicant: ASTRIX ASTRONAUTICS LIMITED, Auckland (NZ)

(72) Inventors: Maximillian Philip Daniels, Auckland (NZ); William Richard Hunter, Central Auckland (NZ)

(73) Assignee: ASTRIX ASTRONAUTICS LIMITED, Auckland (NZ)

(*) Notice: Subject to any disclaimer, the term of this patent is extended or adjusted under 35 U.S.C. 154(b) by 0 days.

(21) Appl. No.: 18/721,578

(22) PCT Filed: Dec. 22, 2022

(86) PCT No.: PCT/IB2022/062654
§ 371 (c)(1),
(2) Date: Jun. 18, 2024

(87) PCT Pub. No.: WO2023/119209
PCT Pub. Date: Jun. 29, 2023

(65) Prior Publication Data
US 2025/0066043 A1  Feb. 27, 2025

(30) Foreign Application Priority Data
Dec. 23, 2021  (AU) ................. 2021904233

(51) Int. Cl.
*B64G 1/22* (2006.01)
*B64G 1/44* (2006.01)

(52) U.S. Cl.
CPC ........... *B64G 1/2227* (2023.08); *B64G 1/443* (2013.01)

(58) Field of Classification Search
CPC ...... B64G 1/2227; B64G 1/222; B64G 1/443; H02S 30/20; E04H 15/20; E04H 2015/201; A45B 19/02; H01Q 15/163; H01Q 1/081
See application file for complete search history.

(56) References Cited

U.S. PATENT DOCUMENTS

| | | |
|---|---|---|
| 3,169,665 A | 2/1965 | Colley |
| 3,248,010 A | 4/1966 | De Boer |

(Continued)

FOREIGN PATENT DOCUMENTS

| | | |
|---|---|---|
| CN | 1769137 A | 5/2006 |
| CN | 101353087 A | 1/2009 |

(Continued)

OTHER PUBLICATIONS

Liu, Jin-guo, et al. Chinese Patent CN-106904294 with English translation. Published 2017-06-30. (Year: 2017).*

(Continued)

*Primary Examiner* — Joshua J Michener
*Assistant Examiner* — Michael B. Kreiner
(74) *Attorney, Agent, or Firm* — Seed Intellectual Property Group LLP

(57) ABSTRACT

The disclosure relates to an inflatable structure comprising a plurality of inflatable ribs attached to a flexible and foldable sheet, and to an inflatable deployment system that deploys such a structure. The inflatable deployment system is suitable for use with or on a spacecraft, and further comprises an electronics module that triggers deployment, a support panel for the inflatable structure, and an inflation system that controls the flow of gas to the inflatable structure. In the deployed condition the plurality of ribs are inflated and the sheet is caused by the ribs to form a substantially planar surface, become less folded, expose a greater exposed (Continued)

surface area compared to in the stowed condition, or become more expanded out. The inflatable structure is secured to the support panel in such a manner that when the ribs are deflated the inflatable structure is located against and/or retained by/to the support panel and when the ribs are inflated the ribs project beyond the support panel.

18 Claims, 16 Drawing Sheets

(56) References Cited

U.S. PATENT DOCUMENTS

| | | | |
|---|---|---|---|
| 3,477,662 A * | 11/1969 | Anderson | H02S 30/20 244/172.6 |
| 3,809,288 A | 5/1974 | Mackal | |
| 3,938,704 A | 2/1976 | Milgram | |
| 4,805,802 A | 2/1989 | MacKendrick et al. | |
| 6,536,712 B1 * | 3/2003 | Barenett | B64G 1/10 244/158.3 |
| 6,568,640 B1 * | 5/2003 | Barnett | B64G 1/2227 244/172.6 |
| 6,647,668 B1 * | 11/2003 | Cohee | B64G 1/2227 52/63 |
| 6,843,029 B2 * | 1/2005 | Breitbach | B64G 1/2225 52/2.13 |
| 8,721,379 B2 | 5/2014 | Becnel | |
| 9,522,747 B2 * | 12/2016 | Coleman | B64D 19/00 |
| 10,427,805 B2 * | 10/2019 | Cecchini | B64G 1/44 |
| 2011/0225963 A1 | 9/2011 | Delbos | |
| 2012/0152306 A1 * | 6/2012 | Iqbal | H02S 20/00 29/592.1 |
| 2015/0176955 A1 | 6/2015 | Slotta et al. | |
| 2018/0162561 A1 | 6/2018 | Estevez et al. | |
| 2018/0339779 A1 | 11/2018 | Bahena et al. | |
| 2018/0341279 A1 | 11/2018 | John et al. | |
| 2019/0039754 A1 | 2/2019 | Beck et al. | |

FOREIGN PATENT DOCUMENTS

| | | |
|---|---|---|
| CN | 106809407 A | 6/2017 |
| CN | 110844120 A | 2/2020 |
| CN | 113800008 A | 12/2021 |
| GB | 2429681 A | 3/2007 |
| WO | WO 2018013905 A2 | 1/2018 |

OTHER PUBLICATIONS

Furuya, Hiroshi, et al. "Properties of Plainly Composed Inflatable Panels." AIAA 2008-2050. (Year: 2008).*

International Search Report and Written Opinion, mailed Apr. 11, 2023, for International Patent Application No. PCT/IB2022/062654. (17 pages).

International Preliminary Report on Patentability, mailed Jan. 19, 2024, for International Patent Application No. PCT/IB2022/062654. (5 pages).

* cited by examiner

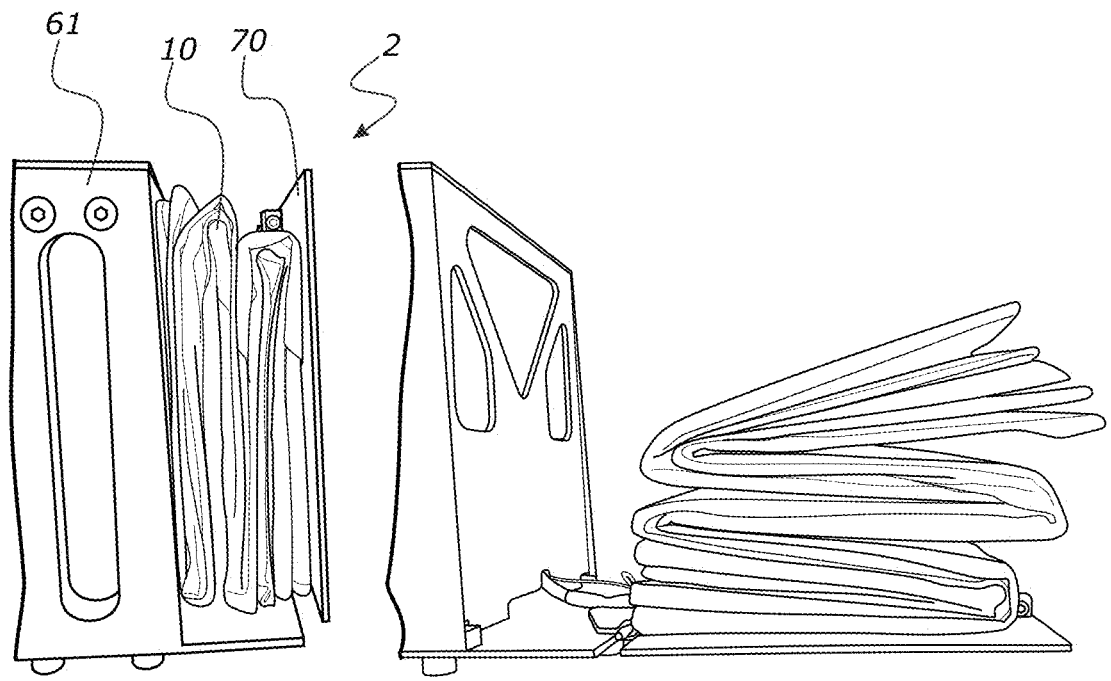
FIG. 15A  FIG. 15B
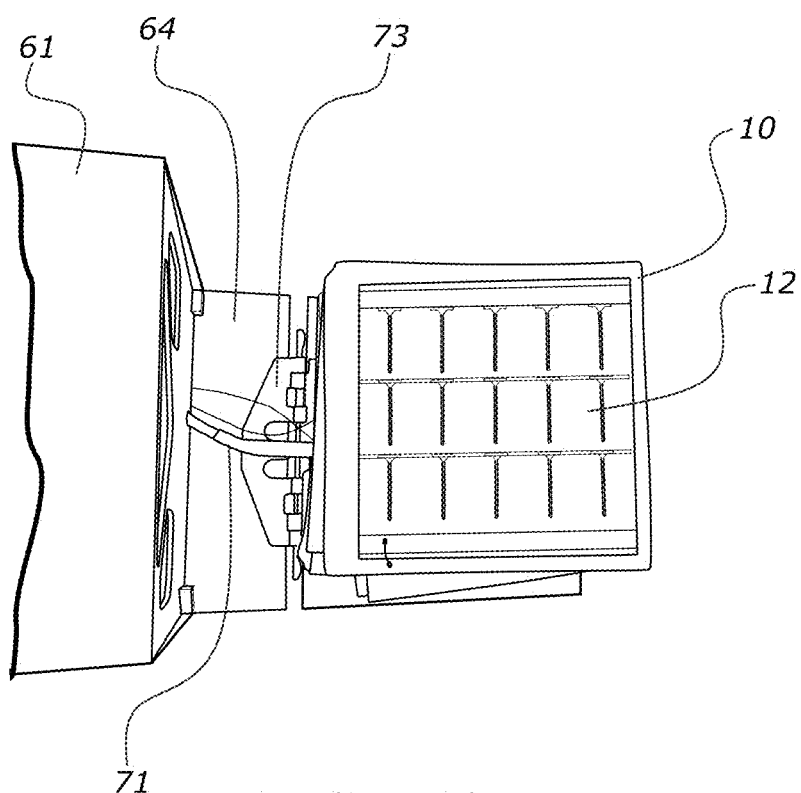
FIG. 15C

INFLATABLE STRUCTURES OF OR FOR SPACECRAFT

BACKGROUND

Technical Field

The present disclosure relates to inflatable structures of or for spacecraft. In particular but not exclusively it relates to an inflatable deployment system that deploys such inflatable structures. More particularly, but not exclusively, it relates to an inflatable deployment system for use in space that deploys inflatable structures that present solar cells.

Description of the Related Art

Since the advent of orbital rocket launches, artificial satellites and space probes have become increasingly numerous. Many new payloads are frequently launched for purposes such as earth observation, communications, scientific experimentation and space exploration. A need that is common to all such satellites is a source of electrical power for operating their various systems and instrumentation, in particular a power source that is lightweight, robust and long-lasting. To reduce mass and take advantage of the plentiful solar energy available in the space environment, photovoltaic cells, i.e., solar panels are a common power source used.

The power made available by solar panels is proportional to the surface area of cells presented, but payloads must often fit within strict volume constraints upon launch. Thus it is desirable to make solar panels deployable such that they launch in a compact configuration and deploy once the payload is in orbit. Various deployment mechanisms exist for this purpose, but these are prone to a variety of issues. Many mechanical systems are prone to failure in the space environment, and such failures are usually impossible to resolve which can lead to the abandonment of a highly expensive spacecraft. Additionally, deployment mechanisms utilizing motors or other complex mechanisms may add significant mass and/or volume to the payload, increasing cost, or may be unusable for small-scale payloads.

In recent years microsatellites have become more common, which can be launched at significantly lower cost through ridesharing arrangements and standardized deployment racks. These microsatellites commonly follow the cubesat standard, wherein a 1 U cubesat is a 10 cm×10 cm×10 cm cube. Cubesats can also be multiples of the 1 U standard and not necessarily cubic, for example a 6 U cubesat. Standardized components are available to suit these dimensions and are often utilized, whereas for a larger satellite more systems may be at least partially custom-made. Space within a cubesat is often extremely limited due to the number of systems that must be accommodated, and power management may be a significant constraint for operation. For example, the camera or scientific instrument of a cubesat may have to be powered down regularly in order to conserve charge. The limited deployable solar panel solutions available for microsatellites are often insufficient to alleviate such power management issues, so mechanisms that increase the amount of solar panel surface area achievable could significantly increase the effectiveness of microsatellites especially.

An inflatable structure has been proposed in U.S. Pat. No. 10,427,805 as a potential deployment mechanism for solar panels. The inflatable structure described could potentially allow greater surface area and hence increased power generation to be achieved, and have reliability benefits over alternative mechanisms, but inflatable structures such as that of U.S. Pat. No. 10,427,805 are likely to suffer from a number of problems in practice. For example, the inflatable ribs would be prone to instability and buckling especially near the central junction, making the attached solar panel unstable. U.S. Pat. No. 10,427,805 also mentions the problem of gases becoming trapped within the folds of the stowed inflatable structure prior to launch (which is undesirable because it could lead to dangerous premature expansion as the external pressure drops to vacuum during launch) and proposes a solution of concertina or double Z-shape folding. However, folding technique alone is unlikely to reliably ensure that there are no pockets of trapped gas.

It is thus desirable to develop solar panel deployment mechanisms that are more compact, more reliable or enable greater power generation than the alternatives, especially mechanisms that are suitable for microsatellites such as cubesats. In the case of microsatellites, it is also desirable if such a mechanism can be made compatible with the cubesat standard such that it can be provided as a module that is simple to integrate with other systems.

In this specification, where reference has been made to external sources of information, including patent specifications and other documents, this is generally for the purpose of providing a context for discussing the features of the present disclosure. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

It may be an object of the present disclosure to provide an inflatable structure and/or inflatable deployment system which overcomes or at least partially ameliorates some of the abovementioned disadvantages or which at least provides the public with a useful choice.

It may also be an object of the present disclosure to provide a spacecraft with an inflatable deployment system.

It may also be an object of the present disclosure to provide a spacecraft with an inflatable solar array.

BRIEF SUMMARY

In a first aspect the present disclosure is an inflatable deployment system suitable for use with or on a spacecraft, the deployment system comprising:
  an inflatable structure comprising a plurality of inflatable ribs attached to a flexible and foldable sheet;
  an electronics module that is configured to trigger the transformation of the inflatable deployment system from a stowed condition in which the plurality of ribs are deflated and the inflatable structure is folded, to a deployed condition in which the plurality of ribs are inflated and the sheet is caused by the ribs to form an approximately planar surface;
  a support panel for the inflatable structure, the inflatable structure being secured to the support panel in a manner such that when the ribs are deflated the inflatable structure retained by/to the support panel and when the ribs are inflated the ribs project beyond the support panel to extend in different directions along the sheet, the support panel supporting the ribs along at least a portion of their length and being parallel to the sheet in the deployed condition such that the support panel supports the ribs in keeping the sheet approximately planar; and an inflation system comprising:
a gas source; and
a flow control mechanism to control flow of gas to the ribs and comprising an outlet in fluid communication with the inflatable structure, wherein the flow control mechanism is configured to allow the ribs to be inflated by gas from the gas source when triggered by the electronics module.

Preferably the gas source comprises a gas reservoir, wherein the flow control mechanism further comprises a plunger configured to move within a chamber of the flow control mechanism from a first position to a second position when triggered by the electronics module, and wherein in the second position the plunger opens or allows an opening of a reservoir seal of the gas reservoir, thereby causing the ribs to be inflated via an inflation path through which gas from the gas source can flow.

Preferably the gas source comprises a gas reservoir.

Preferably in the second position a trigger (e.g., at one end) of the plunger engages and opens or allows an opening of a reservoir seal of the gas reservoir, thereby causing the ribs to be inflated via an inflation path through which gas from the gas source can flow.

Preferably the inflation path begins at the reservoir seal, passes through the chamber and passes through the outlet.

Preferably the chamber defines part of the inflation path between the reservoir and the outlet.

Preferably the trigger of the plunger comprises at least part of a passage or can create a passage that forms part of the inflation path from the gas reservoir through the chamber.

Preferably the trigger of the plunger comprises a passage that forms part of the inflation path from the gas reservoir through the chamber.

Preferably the outlet is in fluid communication with the inflatable structure via a length of flexible tubing.

Preferably the flow control mechanism further comprises an external vent that provides a venting path for trapped gas in the ribs to escape from the inflatable structure when in the stowed condition.

Preferably the venting path begins at the inflatable structure, passes through the outlet, passes through the chamber and leads to the external vent.

Preferably the venting path becomes occluded by the plunger when the plunger is in the second position.

Preferably the plunger is fitted with an annular vent seal that seals against a wall of the chamber.

Preferably the annular vent seal sits between the outlet and the external vent when the plunger is in the second position, thus ensuring the venting path is occluded without leakage.

Preferably the annular vent seal is an o-ring.

Preferably triggering of the flow control mechanism is electronically resettable.

Preferably the plunger is biased by a spring that biases the plunger into either the first position or the second position.

Preferably the spring biases the plunger into the first position.

Preferably the plunger is part of a solenoid controlled by the electronics module, and wherein the electronics module is configured to trigger the plunger by energizing the solenoid thereby overcoming force provided by the spring and causing the plunger to move to the second position.

Preferably the spring biases the plunger into the second position.

Preferably the plunger is held in the first position by a valve pyro-cutter wire in tension and attached to the plunger, and wherein the electronics module is configured to trigger the plunger by severing the valve pyro-cutter wire thereby causing the spring to move the plunger to the second position.

Preferably the support panel is a hinged panel held in an initial position in the stowed condition and that moves to a final position in the deployed condition.

Preferably the hinged panel retains the inflatable structure in a folded configuration when in the initial position, and wherein the hinged panel is freed to move when triggered by the electronics module and allows unfolding of the inflatable structure when in the final position.

Preferably the hinged panel has a hinge comprising a torsional spring that biases the hinged panel towards the final position.

Preferably the hinged panel is held in place in the stowed condition by one or more panel pyro-cutter wires, and wherein the electronics module is configured to trigger the freeing of the hinged panel by severing the one or more panel pyro-cutter wires.

Preferably all pyro-cutter wires pass through one or more pyro-cutters controlled by the electronics module.

Preferably all pyro-cutter wires pass through a plurality of pyro-cutters controlled by the electronics module, and wherein the pyro-cutters beyond the first are redundant backups to improve the chance of successful deployment.

Preferably the number of pyro-cutters is two.

Preferably the inflation system further comprises at least one pressure sensor configured to monitor the pressure in the gas source and/or the chamber.

Preferably at least some of the plurality of inflatable ribs extend outwardly from a junction at which the ribs meet, and wherein the junction is located at a sheet periphery of the sheet.

Preferably the junction is located centrally along an inner edge of the sheet periphery.

Preferably the inflatable ribs include two horizontal ribs that extend from the junction in opposite directions along the inner edge of the sheet periphery, and two diagonal ribs that extend from the junction towards far corners of the sheet periphery.

Preferably the inflatable structure further comprises reinforcing ribs that join or intersect with the horizontal ribs and the diagonal ribs.

Preferably diagonal ribs that connect to the junction are constricted near the junction.

Preferably the junction is mounted to the support panel.

Preferably a terminal end of each of the ribs is attached to the sheet adjacent the sheet periphery, wherein the terminal ends are within a support panel periphery of the support panel in the stowed condition, and wherein upon inflation of the ribs each terminal end is located outwardly of the support panel, the ribs having expanded the sheet such that the sheet periphery encompasses a greater area than the support panel periphery in the deployed condition.

Preferably the inflatable deployment system comprises two inflatable structures having separate support panels.

Preferably the inflatable structures are provided on opposing sides of a central point of the inflatable deployment system.

Preferably each of the inflatable structures is in fluid communication with a separate flow control mechanism.

Preferably the plurality of inflatable ribs contain a filler material extending along the length of each of the ribs, and wherein gas can flow through or around the filler material when the inflatable structure is folded in the stowed condition.

Preferably the filler material is porous.

Preferably the filler material is ridged.

Preferably a terminal end of each of the ribs is attached to the sheet adjacent a sheet periphery, wherein the terminal ends are within a support panel periphery of the support panel in the stowed condition, and wherein upon inflation of the ribs each terminal end is located outwardly of the support panel, the ribs having expanded the sheet such that the sheet periphery encompasses a greater area than the support panel periphery in the deployed condition.

Preferably the inflatable structure has four ribs attached to the respective flexible and foldable sheet.

Preferably the inflatable ribs are tubular.

Preferably the sheet forms a quadrilateral shape in the deployed condition.

Preferably the ribs are made from non-elastic material.

Preferably the flexible and foldable sheet acts a solar panel and presents a plurality of solar cells.

Preferably the flexible and foldable sheet is an aerobraking sail.

Preferably the inflatable deployment system further comprises a platform upon which some or all other components are mounted, the platform configured to be coupled to a spacecraft.

Preferably the base unit has a bottom surface with an approximately 10 cm×10 cm area suitable for mounting to a spacecraft that follows the cubesat standard.

In another aspect the disclosure broadly comprises a spacecraft comprising or mounting the inflatable deployment system.

Preferably the spacecraft is a cubesat.

Preferably the spacecraft is between 40-500 kg.

Preferably at least the inflatable structure and the flexible and foldable sheet are mounted at the end of a boom of the spacecraft.

Preferably the inflatable deployment system is provided as a single unit mounted directly to the spacecraft.

In another aspect the disclosure broadly comprises an inflatable structure comprising a plurality of inflatable ribs attached to a flexible and foldable sheet, at least some of the inflatable ribs extending in different directions away from a junction at which the ribs meet, wherein the junction is located at a sheet periphery of the sheet, wherein the inflatable structure is configured to transform from a stowed condition in which the plurality of ribs are deflated and the inflatable structure is folded, to a deployed condition in which the plurality of ribs are inflated and the sheet is caused by the ribs to form an approximately planar surface, and wherein the junction is mountable to a support panel which can secure the inflatable structure thereto, allow the ribs to project beyond the support panel when the ribs are inflated, and can contact the ribs along at least a portion of their length and be parallel to the sheet in the deployed condition such that the support panel supports the ribs in keeping the sheet approximately planar.

Preferably the junction is located centrally along an inner edge of the sheet periphery.

Preferably the inflatable ribs include two horizontal ribs that extend from the junction in opposite directions along the inner edge of the sheet periphery, and two diagonal ribs that extend from the junction towards far corners of the sheet periphery.

Preferably the inflatable structure further comprises peripheral reinforcing ribs that extend along edges of the sheet periphery to join the terminal ends of the horizontal ribs and diagonal ribs.

Preferably the inflatable structure further comprises a central reinforcing rib extending from the junction orthogonally from the horizontal ribs and in between the diagonal ribs towards a far edge of the sheet periphery.

Preferably the inflatable structure further comprises a lattice of reinforcing ribs provided across the sheet that intersect with each other, with the horizontal ribs, and with the diagonal ribs.

Preferably some or all of the reinforcing ribs are of a smaller diameter than the other inflatable ribs.

Preferably the junction is located at a corner of the sheet.

Preferably there are two orthogonal horizontal ribs extending from the junction along edges of the sheet periphery, and one diagonal rib extending from the junction to a far corner of the sheet periphery.

Preferably the inflatable ribs are attached to the sheet by a strip of adhesive running along a top surface of each rib.

Preferably the inflatable ribs each have a tab at a terminal end that wraps around the sheet periphery and is secured to the sheet.

Preferably the inflatable ribs are attached to the sheet periphery by elastic connectors at the terminal ends such that the inflatable ribs tension the sheet in the deployed condition.

Preferably diagonal ribs that connect to the junction are constricted near the junction.

Preferably the inflatable ribs contain a filler material extending along the length of each of the ribs, and wherein gas can flow through or around the filler material when the inflatable structure is folded in the stowed condition.

Preferably the filler material is porous.

Preferably the filler material is ridged.

Preferably the inflatable ribs are tubular.

Preferably the sheet is quadrilateral in the deployed condition.

Preferably the sheet acts as a solar panel and presents a plurality of solar cells.

In another aspect the disclosure broadly comprises a method of manufacturing the inflatable structure, the method comprising the steps of:
   a) cutting two flat sheets of material into the desired shape of the inflatable ribs, thereby forming a pair of rib templates;
   b) heat sealing the rib templates together along edges to form the inflatable ribs; and
   c) attaching the inflatable ribs to the flexible and foldable sheet.

In another aspect the disclosure broadly comprises a method of folding the inflatable structure, the method comprising the steps of:
   a) concertina folding the sheet along the longer horizontal dimension of the sheet; and then
   b) concertina folding the sheet along the shorter dimension of the sheet.

Preferably step a) is performed by interlocking the folds on alternating sides.

Preferably the method further comprises a step of actively extracting gas from the inflatable structure during or after folding by applying a vacuum or partial vacuum.

In another aspect the disclosure broadly comprises an inflation system comprising:
a gas source;
a flow control mechanism comprising an outlet configured to be in fluid communication with at least one inflatable structure, the flow control mechanism comprising:
a plunger movable within a chamber of the flow control mechanism from a first position to a second position, wherein in the second position a trigger at one end of the plunger opens or allows opening of a reservoir seal of the gas source thereby causing gas to be released via an inflation path passing through the outlet;
an external vent that provides a venting path from the outlet when the plunger is in the first position, and wherein the venting path becomes occluded by the plunger when the plunger is in the second position; and
an electronics module configured to trigger the plunger to move from the first position to the second position and thereby release gas from the gas source.

Preferably the gas source comprises a gas reservoir.

Preferably the inflation path begins at the reservoir seal, passes through the chamber and passes through the outlet.

Preferably the trigger of the plunger comprises a passage that forms part of the inflation path from the gas reservoir through the chamber.

Preferably the venting path begins at the outlet, passes through the chamber and leads to the external vent.

Preferably the plunger is fitted with an annular vent seal that seals against a wall of the chamber.

Preferably the annular vent seal sits between the outlet and the external vent when the plunger is in the second position, thus ensuring the venting path is occluded without leakage.

Preferably the annular vent seal is an o-ring.

Preferably triggering of the flow control mechanism is electronically resettable.

Preferably the plunger is held in the first position by a pyro-cutter wire in tension and attached to the plunger, and wherein the electronics module is configured to trigger the plunger by severing the pyro-cutter wire thereby causing a spring to move the plunger to the second position.

Preferably the pyro-cutter wire passes through one or more pyro-cutters controlled by the electronics module.

Preferably the pyro-cutter wire passes through a plurality of pyro-cutters controlled by the electronics module, and wherein the pyro-cutters beyond the first are redundant backups.

Preferably the number of pyro-cutters is two.

Preferably the inflation system further comprises at least one inflatable structure in fluid communication with the outlet and wherein the at least one inflatable structure is in a deflated condition when the plunger is in the first position.

Preferably the outlet is in fluid communication with the inflatable structure via a length of flexible tubing.

Preferably the inflatable structure contains a flexible sheet of filler material, and wherein gas can flow through the filler material when the inflatable structure is in the deflated condition.

Preferably the inflation system further comprises at least one pressure sensor configured to monitor the pressure in the gas source and/or the chamber.

Other aspects of the disclosure may become apparent from the following description which is given by way of example only and with reference to the accompanying drawings.

As used herein the term "and/or" means "and" or "or," or both.

As used herein "(s)" following a noun means the plural and/or singular forms of the noun.

The term "comprising" as used in this specification and claims means "consisting at least in part of." When interpreting statements in this specification and claims which include that term, the features, prefaced by that term in each statement, all need to be present but other features can also be present. Related terms such as "comprise" and "comprised" are to be interpreted in the same manner.

BRIEF DESCRIPTION OF THE SEVERAL VIEWS OF THE DRAWINGS

The disclosure will now be described by way of example only and with reference to the drawings in which:

FIG. 15A shows a front view of the concertina folded sheet in the stowed condition;

FIG. 15B shows a front view of the concertina folded sheet at the b;

FIG. 15C shows a top view of the concertina folded sheet at the beginning of deployment;

DETAILED DESCRIPTION

The present disclosure relates to inflatable structures 20, and an inflatable deployment system 1 suitable for use with or on a spacecraft 4 that deploys such inflatable structures 20. The inflatable deployment system 1 may deploy inflatable structures 20 that present solar panels, which may be used to power a spacecraft 4. However, it will be appreciated that the inflatable deployment system 1 and inflatable structures 20 may be suitable for various other applications as will be described.

The term 'spacecraft' as used in this specification refers to any device or vehicle that is intended to be launched into and operate in the space environment (including on the surface of non-earth planets, moons, or other bodies) and that is equipped with electronic systems. This includes at least artificial satellites and probes for use in orbit of earth or any other celestial body, but may additionally include other payloads such as landers or rovers intended to operate in a location remote from earth.

According to various aspects of the various embodiments of the present disclosure as illustrated in FIGS. 1-16B, there is provided an inflatable deployment system 1 which will now be described.

Figure 1:
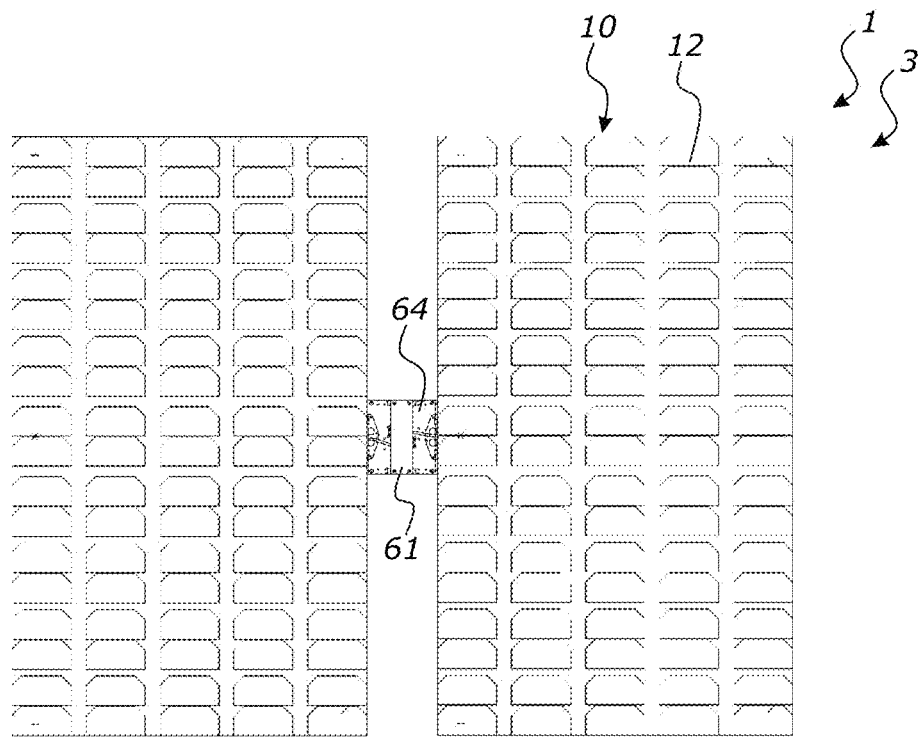
FIG. 1 shows a top view of the inflatable deployment system in the deployed condition.
Figure 2:
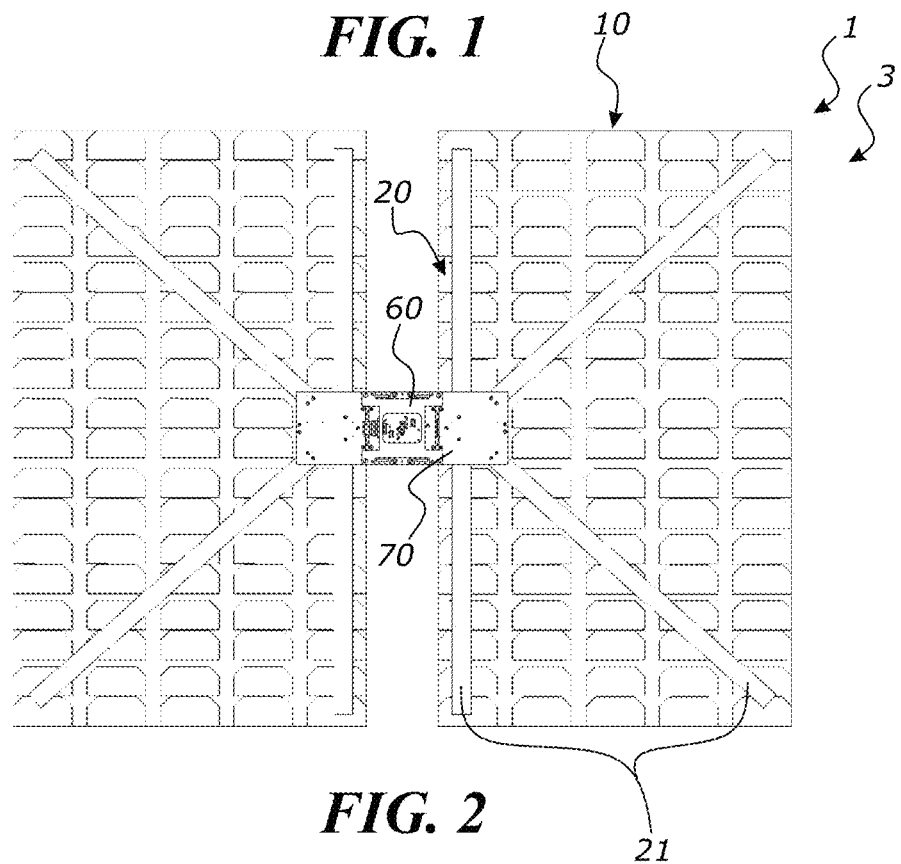
FIG. 2 shows a bottom view of the inflatable deployment system in the deployed condition.

As shown in FIGS. 1-2, the inflatable deployment system 1 comprises one or more inflatable structures 20 comprising flexible and foldable sheets 10 each attached to a plurality of inflatable ribs 21 (shown here in a deployed condition 3). Preferably the inflatable deployment system 1 comprises two inflatable structures 20, but in other configurations could provide only one or a greater number.

The flexible and foldable sheets 10 most preferably act as solar panels, and as such each foldable sheet 10 preferably presents an array of solar cells 12 on at least one side. The solar cells 12 are preferably square shaped and arranged in a grid with small gaps between them. The solar cells 12 may be flexible to some extent, however gaps provided between the solar cells 12 allow concertina/accordion folding of the sheet 10 even if the solar cells 12 used are substantially rigid. Various other shapes for solar cells 12 are possible, for example hexagons, but may necessitate specially adapted folding arrangements.

The sheets 10 could instead be used for some other purpose that benefits from a large deployable surface area with lightweight/compact deployment hardware. For example, the sheets 10 may act a solar sail, aerobraking/drag sail, heat shield, thermal protection system, solar concentrator, antenna surface, or any similar device or part thereof.

In the deployed condition 3 as is depicted in FIGS. 1 and 2, each sheet 10 is fully unfolded to a rectangular shape. However, each sheet 10 could alternatively be configured to unfold into any other suitable shape, for example a different quadrilateral or a semicircle. In the unfolded condition each sheet 10 is preferably in a planar format. Where multiple sheets 10 are provided they are preferably approximately coplanar, but alternatively they may be at an angle to each other.

Each inflatable structure 20 has ribs 21 that take on a preferably tubular shape when inflated that supports the sheet 10. However, other suitable shapes may be used. The ribs 21 of each inflatable structure 20 are preferably supported at least partially by a support panel 70 substantially parallel to the sheet 10.

Figure 3A:
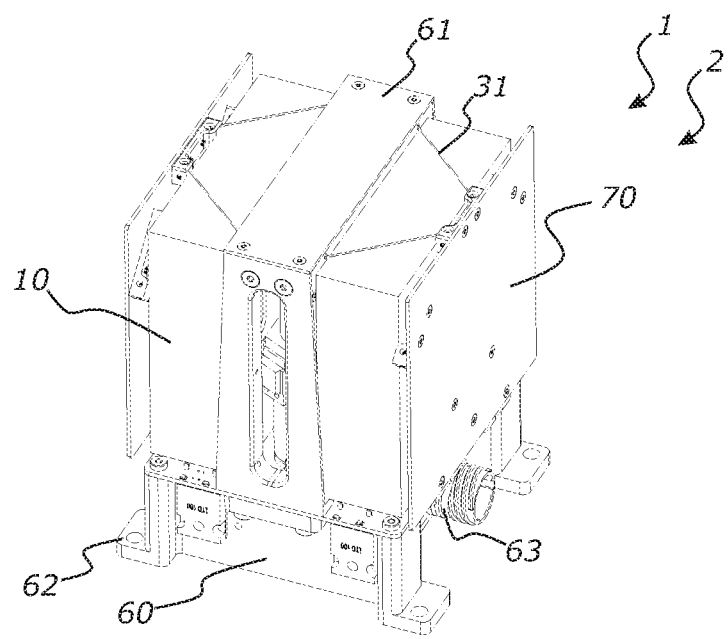
FIG. 3A shows a perspective view of the inflatable deployment system in the stowed condition.

As shown in FIG. 3A, the inflatable deployment system 1 begins in a stowed condition 2 wherein each inflatable structure 20 (including both the sheet 10 and uninflated ribs 21) is in a compact folded configuration. Preferably, each folded inflatable structure 20 is retained by a support panel 70 attached to a platform 64.

The term "deflated," "uninflated" or similar as used herein to describe the state of the inflatable structure 20 or any part thereof (e.g., its ribs 21) may indicate that the inflatable structure 20 does not contain any inflation gas, or it may contain some gas but the quantity of such gas is substantially less than when the inflatable structure 20 is inflated. When the inflatable structure 20 is "deflated," it is to be taken to mean that it is not inflated, or is substantially less inflated compared to when it is "inflated."

The term "inflated" as used herein to describe the state of the inflatable structure 20 or any part thereof (e.g., its ribs 21) may indicate that the inflatable structure 20 contains inflation gas, and that the quantity of such gas is substantially more than when the inflatable structure is "deflated." When the inflatable structure 20 is "inflated," it is to be taken to mean that it is inflated substantially more compared to when it is "deflated," even though the inflatable structure 20 may be capable of being further inflated.

The support panels 70 are preferably hinged panels secured at one edge to the platform 64 by hinges 73. The support panel 70 may then be releasably secured at an opposite edge to the platform 64 to hold the support panel 70 in an initial upright position when the inflatable deployment system 1 is in the stowed condition 2, thereby retaining the sheets 10 in their compact folded configuration. This is preferably achieved by a securing means such as panel pyro-cutter wires 31 connected to at least one pyro-cutter 33. The pyro-cutter 33 may be controlled by an electronics module 30.

Each inflatable structure 20 may be retained in the stowed condition 2 by contact with a support panel 70 on one side and contact with a central housing 61 of the platform 64 on the other side. The support panel 70 and housing 61 may thus form a compartment that retains the inflatable structure 20 in the stowed condition. The panel pyro-cutter wires 31 may also assist in retaining the inflatable structure 20 within the compartment.

Figure 3B:
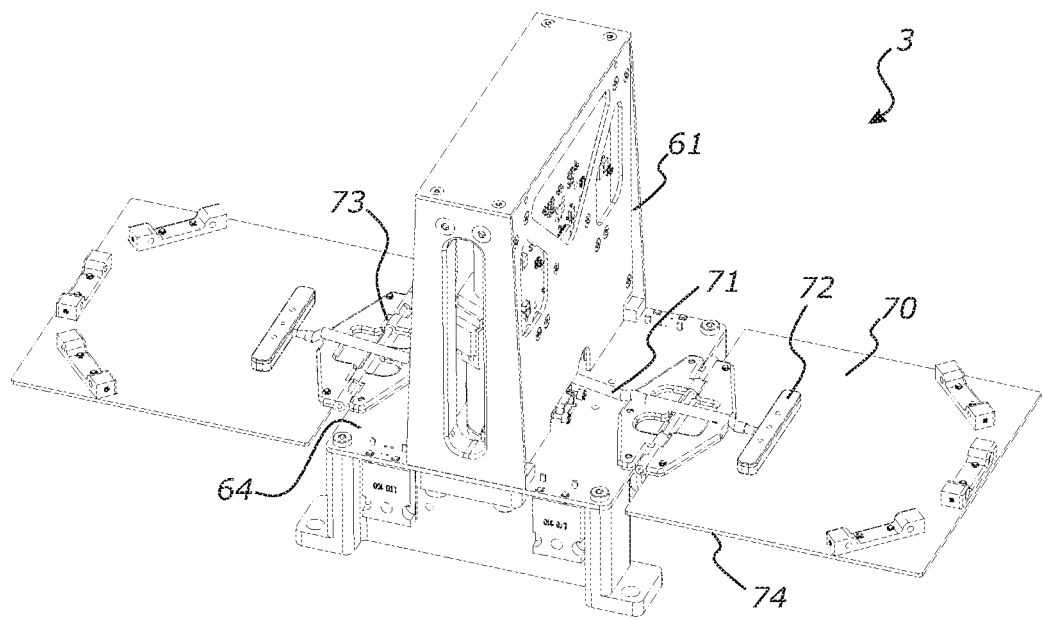
FIG. 3B shows a perspective view of the inflatable deployment system in the deployed condition without the sheets or the inflatable structures.

As shown in FIG. 3B, the inflatable deployment system 1 can be triggered for deployment by the electronics module 30 to allow it to transform from the stowed condition 2 to a deployed condition 3. In the deployed condition 3, the support panels 70 are moved away from the platform 64 such that they will no longer retain the inflatable structures 20 in their compact folded configuration to the platform 64. Support panels 70 are freed to be able to move by the electronics module 30, preferably by severing the pyro-cutter wires 31. The inflatable structures 20 are omitted from FIG. 3B for clarity, but after the support panels 70 are freed to move the inflatable structures 20 can be triggered by the electronics module 30 to inflate. The deployed condition 3 is achieved once inflation has completed.

The support panels 70 may be biased towards a final position in the deployed condition 3, for example by torsional springs fitted within the hinges 73. Stops may prevent the support panels 70 from moving beyond the final position, which is preferably orthogonal to the initial upright position in the stowed condition 2. The hinged support panels 70 may thus swing through a ninety-degree arc between the initial position and the final position. Alternatively, flexible tubing 71 through which gas passes to inflate the inflatable structures 20 may exert a force on the support panels 70 sufficient to move them into the final position during inflation.

Support panels 70, rather than being hinged panels, could instead be fixed panels either attached to the platform 64 or forming part of a spacecraft 4. In this case the support panels 70 would not move between the stowed condition 2 and the deployed condition 3, however there would still need to be a release mechanism of some kind to retain the folded inflatable structure 20 in the stowed condition 2. These fixed panels would still be able to support the inflatable structure 20, however hinged panels allow the inflatable deployment system 1 to be more compact in the stowed condition 2 and to more effectively retain the folded sheet 10.

The platform 64 preferably provides a mounting point for the support panels 70, the electronics module 30 and the inflation system 40. The platform 64 may be attached to the top of a base unit 60. Preferably the platform 64 is formed from one or more plates having appropriate mounting holes.

The electronics module 30 and the inflation system 40 may be contained within a housing 61 that is mounted to the platform 64, preferably at a central strip. Support panels 70 are preferably mounted at opposed edges of the platform 64 by the hinges 73.

The platform 64 or the base unit 60 may provide spacecraft mounting points 62 in order to facilitate the secure mounting of the inflatable deployment system 1 on to a spacecraft 4. The mounting points 62 are preferably provided at corners of the platform 64 or the base unit 60.

An electrical connector 63 is preferably presented somewhere on the inflatable deployment system 1 to electrically connect the inflatable deployment system 1 to the spacecraft 4. This allows the inflatable deployment system 1 to exchange electrical power with a battery on board the spacecraft 4 for example, which could include charging the battery via energy collected by solar cells 12 and/or receiving power to operate the electronics module 30. In FIG. 3A the electrical connector 63 is shown to be a threaded connector provided at the base unit 60, but various other connector types and locations are possible.

Figure 4A:
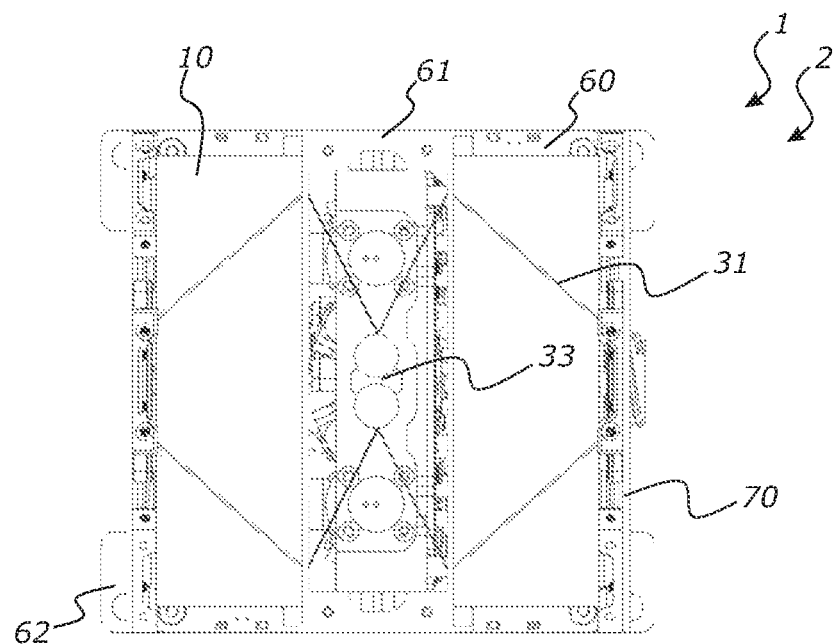
FIG. 4A shows a top cross-sectional view of the inflatable deployment system in the stowed condition.

As shown in FIG. 4A, the support panels 70 are preferably held in the initial upright position in the stowed condition 2 by panel pyro-cutter wires 31 attached between the support panels 70 and at least one pyro-cutter 33. Panel pyro-cutter wires 31 are routed across the top of the folded inflatable structure 20 and may assist in constraining the inflatable structure 20 such that it is prevented from unfolding. Panel pyro-cutter wires 31 are routed through holes in the housing 61 and connected to a connection point in the middle of the edge of each support panel 70, such that the wires are diagonally routed across the folded inflatable structure 20. Each support panel 70 may be connected to more than one panel pyro-cutter wire 31 which are severed simultaneously by pyro-cutter 33.

Panel pyro-cutter wires 31 may alternatively been routed in other suitable ways, for example the support panel 70 may provide two or more connection points that are not necessarily in the middle. The routing may be direct and parallel rather than diagonal.

In alternative embodiments, electronics module 30 may trigger the opening of the support panels 70 by some means other than panel pyro-cutter wire 31, for example a solenoid latch. Other alternative means for triggering the opening include a pin puller (for example using shape memory alloy actuation), burn wire, UV degrading wire, or any other suitable electronically activated mechanism. Although it is not necessary for the triggering mechanism to be resettable during on-orbit deployment, an easily (preferably electronically) resettable mechanism such as a pin puller or solenoid may be desirable for testing purposes prior to launch.

Figure 4B:
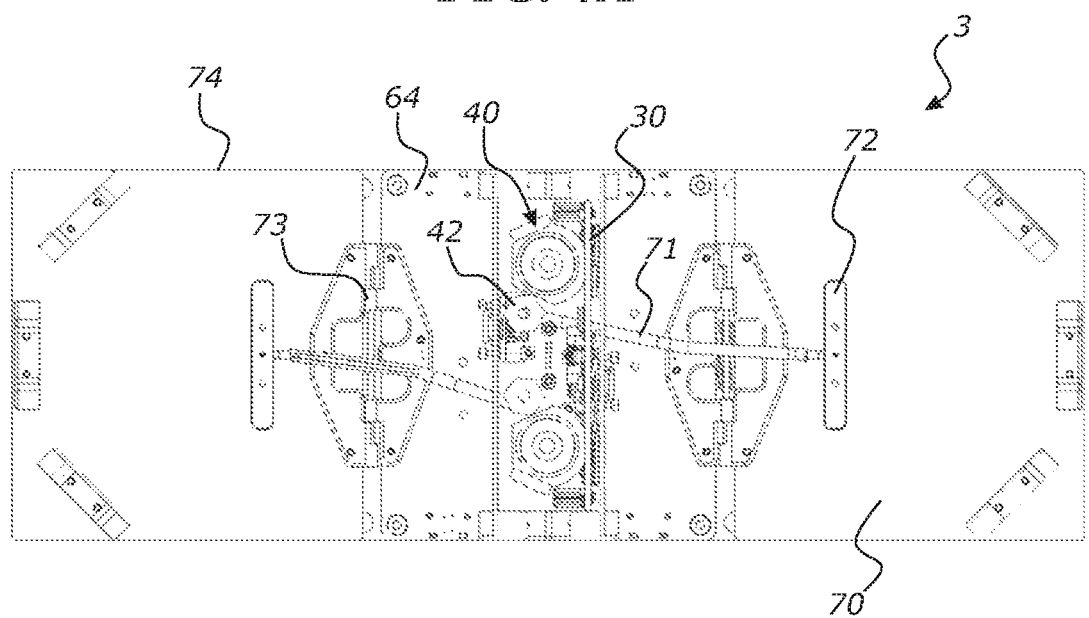
FIG. 4B shows a top cross-sectional view of the inflatable deployment system in the deployed condition without the sheets or the inflatable structures.

As shown in FIG. 4B, an inflation system 40 is used to inflate the inflatable structures 20. The inflation system 40 comprises one or more flow control mechanisms 41, preferably one for each inflatable structure 20. Inflation causes the inflatable structures 20 to move to their deployed condition 3. The inflation system 40 provides outlets 42 to which flexible tubing 71 is attached. The flexible tubing 71 extends to an inflation connector 72 of each support panel 70, to which the inflatable structure 20 is attached. Gas can then move through an inflation path from the inflation system 40, through the tubing 71, though the inflation connector 72 and into the ribs 21 of the inflatable structure 20.

Where the sheet 10 is a solar panel or another electrical device, an electrical connection may be made between the sheet 10 and the electronics module 30 by electrical wires not shown.

Preferably there is one flow control mechanism 41 provided for each inflatable structure 20, providing redundancy in that if one of the inflation systems 40 fails to deploy or maintain the deployment of its inflatable structure 20, the other may still succeed. In the case of sheets 10 being solar panels the power provided by the inflatable deployment system 1 may then be halved, but this may still be sufficient power to perform mission-critical functions.

The inflation connector 72 is preferably coupled to the inflatable structure 20 at a junction 24 of a plurality of ribs 21. Thus, it preferably simultaneously inflates all of the ribs 21. The ribs 21 may in other ways be each in fluid communication with each other to facilitate their simultaneous inflation.

Figure 5:
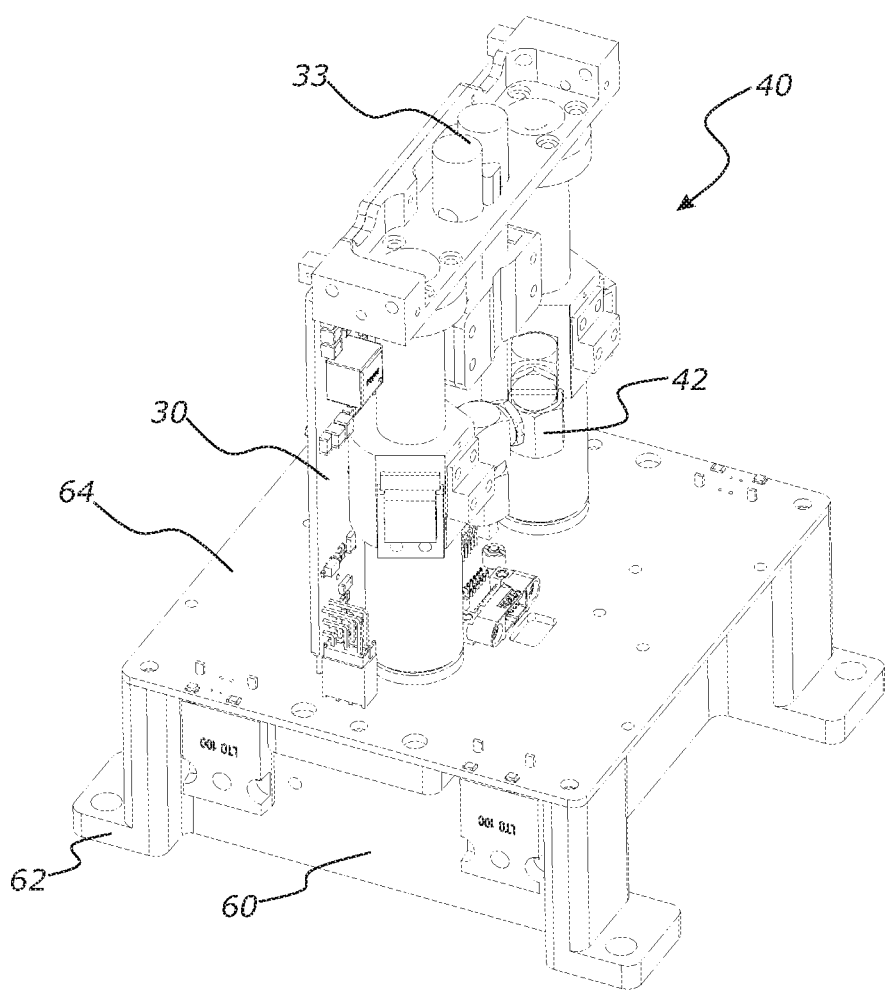
FIG. 5 shows a perspective view of the base unit and the inflation system.

As shown in FIG. 5, the electronics module 30 may be a circuit board mounted adjacent the inflation system 40. The electronics module 30 and the inflation system 40 are preferably mounted upright upon the base unit 40 and along a central strip. The pyro-cutter 33 is mounted on and connected to the electronics module 30.

Figure 6:
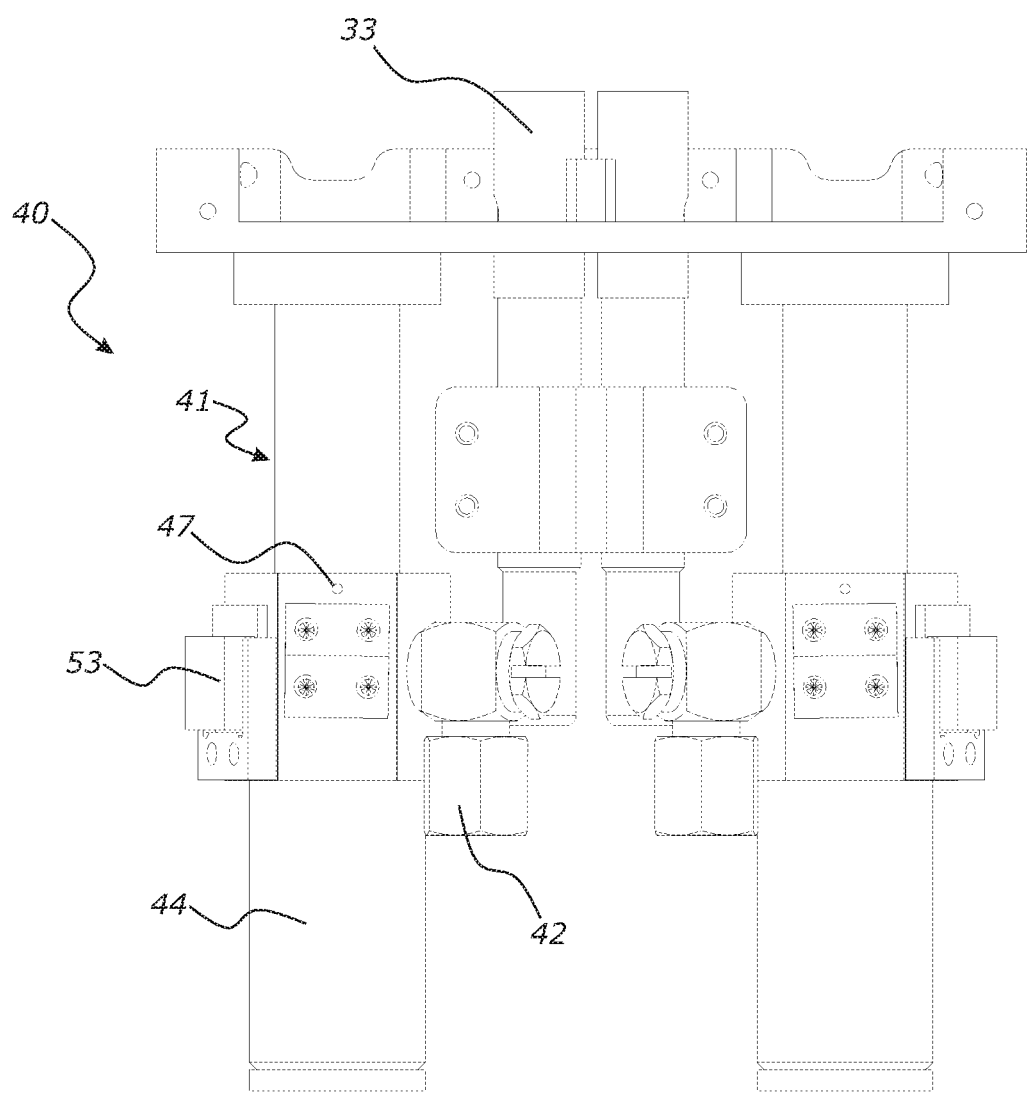
FIG. 6 shows a front view of the inflation system.

As shown in FIG. 6, the inflatable deployment system 1 preferably comprises an inflation system 40 comprising one flow control mechanism 41 for each inflatable structure 20, the flow control mechanisms 41 having outlets 42 to which tubing 71 can be attached. The inflation system 40 preferably further comprises at least one pyro-cutter 33 that may be controlled by the electronics module 30. An external vent 47 is provided in each flow control mechanism 41 of the inflation system 40 to allow gas from the inflatable structure 20 to escape. Each flow control mechanism 41 is connected to a gas source 44.

The gas source 44 is most preferably a gas reservoir of compressed gas, however it could potentially also be a source that produces gas for example by chemical or physical reaction. In this case the gas source 44 may store one or more liquids or solids that at some stage undergo reaction to become gaseous, i.e., a cold gas generator.

The inflation system 40 may also comprise pressure sensors 53 to measure the pressure within the gas source 44 and/or the flow control mechanism 41. Because the pressure will change during inflation as gas moves to the inflatable structure 20, the pressure sensors 53 can thus be used to monitor the progress of inflation and confirm successful deployment once pressure has equalized. A camera or other sensors may also be used to monitor and confirm deployment. Pressure sensors 53 can also be used to detect leaks or other anomalies in the gas source 44 prior to deployment.

Figure 7:
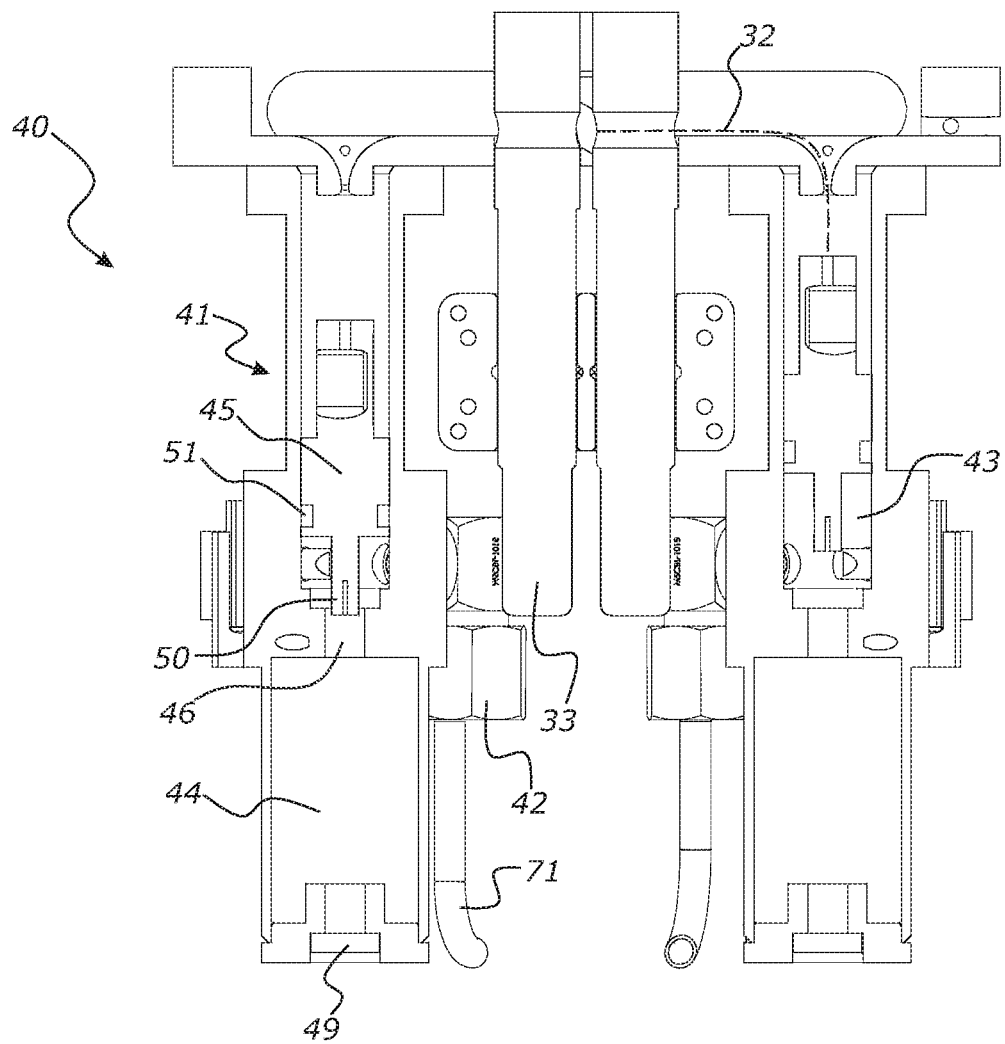
FIG. 7 shows a front cross-sectional view of the inflation system.
Figure 8:
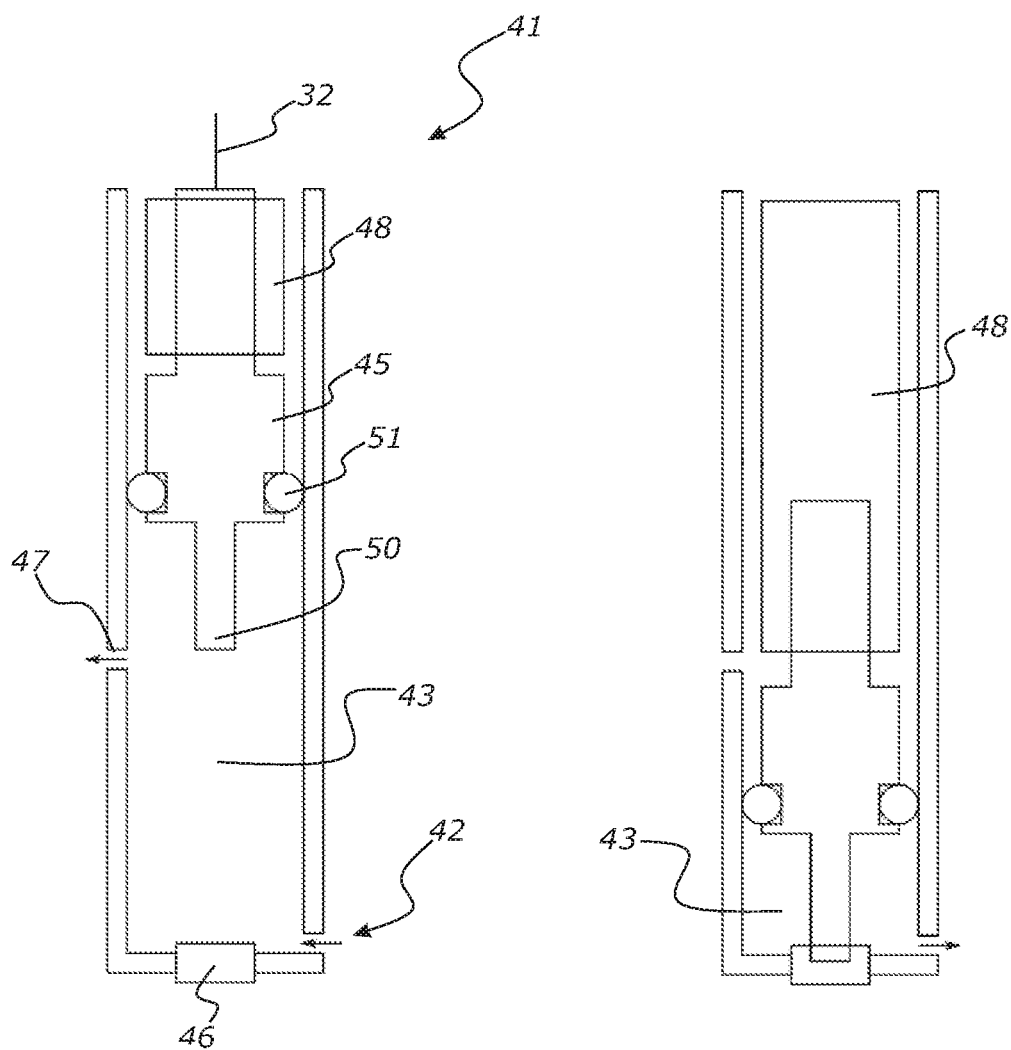
FIG. 8A shows a front cross-sectional view of the flow control mechanism with the plunger in the first position.
FIG. 8B shows a front-cross sectional view of the flow control mechanism with the plunger in the second position.

As shown in FIG. 7, each flow control mechanism 41 preferably has a chamber 43, a gas source 44, and a reservoir seal 46 that separates the chamber 43 and the gas source 44.

In a preferred embodiment of the flow control mechanism 41, the reservoir seal 46 is configured to open when subjected to mechanical force, thus allowing the flow of gas from the gas reservoir 44 to the chamber 43. A plunger 45 is contained within the chamber 43 that can move linearly between a first position where the plunger 45 is retracted and a second position where a trigger 50 at one end of the plunger 45 engages with the reservoir seal 46 to open it. The plunger 45 is preferably retained in the first position corresponding to the inflatable structure 20 being in the stowed condition 2 by a valve pyro-cutter wire 32 connected between the pyro-cutter 33 and the plunger 45.

Many variations of the plunger 45 are possible. In alternative embodiments, the trigger 50 could be in some location on the plunger 45 other than at one end, for example on the side, and the reservoir seal 46 could be provided in the side of the chamber 43. The trigger 50 may not necessarily engage the reservoir seal 46 directly, but rather allow the reservoir seal 46 to open by aligning with it in the second position.

The reservoir seal 46 is preferably a push-to-release type valve, similar in structure to a check valve, that opens when subjected to a force by the trigger 50. This could be a spring-loaded valve, a ball valve, a diaphragm valve, or another suitable type. Alternatively, it may be a membrane that is ruptured upon contact by the trigger 50.

In alternative embodiments, the reservoir seal 46 may be a thermal valve made of a material that melts when subjected to heat, e.g., solder. If a cold gas generator is used as the gas source 44, then a reservoir seal 46 may not be necessary. In such embodiments where the reservoir seal 46 is not opened by mechanical force, a plunger 45 may be unnecessary.

Each gas reservoir 44 may additionally have a gas fill valve 49 on an exterior surface. The gas fill valve 49 may be of a push-to-open type and can be used to fill the gas reservoir 44 from an exterior source of gas prior to launch. Preferably the gas is air stored inside the gas reservoir 44. It is preferably stored at a pressure higher than atmospheric pressure encountered at sea level on earth. There is preferably no electronic means to actuate the gas fill valve 49 provided on the inflatable deployment system 1, as it serves no function after the reservoir has been filled.

The gas fill valve 49 provides a convenient way to fill the gas sources 44 prior to launch, which allows them to be filled while the inflation system 40 (and potentially the entire spacecraft 4 to which it is mounted) is fully assembled. Alternatively, the gas reservoirs 44 may be configured to be disengagable from the chamber 42, for example by a threaded connection, such that the gas reservoirs 44 can be filled via the reservoir seal 46 and then screwed on to the chamber 42 prior to launch.

In an alternative embodiment, a single flow control mechanism 41 could be used to supply multiple inflatable structures 20 by providing multiple outlets 42, or by the addition of a splitter connected downstream from the outlet 42 that splits the supply of gas between the multiple inflatable structures 20. This may contribute to weight reduction, but if the sole flow control mechanism 41 fails then all of the inflatable structures 20 will fail to deploy or fail to remain deployed. In a further alternative embodiment, a single gas reservoir 44 could be used to feed multiple flow control mechanisms 41. This could also contribute to weight reduction, but a leak in either flow control mechanism 41 or the gas reservoir 44 could cause all of the inflatable structures 20 to fail to deploy or fail to remain deployed.

As shown in FIGS. 8A and 8B, the plunger 45 is configured to move linearly in the chamber 43 between a first position and a second position. The plunger 45 may be triggered to move from the first position to the second position by the electronics module 30, preferably by severing a valve pyro-cutter wire 52 that is connected between the pyro-cutter 33 and the plunger 45. Alternatively, the plunger 45 may be configured as a solenoid valve such that it is triggered by the activation of a coil winding.

The at least one pyro-cutter 33 preferably has both the panel pyro-cutter wires 31 and the valve pyro-cutter wires 32 passing through it. The pyro-cutter 33 is controlled by the electronics module 30 and is configured to sever all the wires passing through it simultaneously upon application of electrical current. Preferably more than one pyro-cutter 33 is used and all pyro-cutters 33 have all of the panel pyro-cutter wires 31 and the valve pyro-cutter wires 32 running through them. Pyro-cutters 33 beyond the first are preferably activated simultaneously to the first and act as redundant backups such that if the first pyro-cutter 33 fails to sever the wires, one of the backup pyro-cutters 33 likely will. The use of multiple pyro-cutters 33 thus adds redundancy that reduces the risk of deployment failure.

Where two flow control mechanisms 41 are used, they may share the same valve pyro-cutter wire 32 such that a single valve pyro-cutter wire 32 held in tension links two plungers 45 and passes through at least one pyro-cutter 33.

In an alternative embodiment, panel pyro-cutter wires 31 and valve pyro-cutter wires 32 could be routed through separate pyro-cutters 33 such that they could be severed in sequence, for example the pyro-cutters 33 may be configured such that they first sever the panel pyro-cutter wire 31 to release support panels 70, and then to sever the valve pyro-cutter wire 32 to begin inflation of the inflatable structures 20. Deployment can occur without issue using simultaneous release of the panels 70 and commencement of inflation however, so using the limited space available to provide redundancy is preferable.

A spring 48 is preferably mounted adjacent the plunger 45 in order to bias the plunger 45 to or towards one of the two positions. Preferably it is configured to bias the plunger 45 towards the second position, such that when the retaining force provided by the valve pyro-cutter wire 52 is removed, the plunger 45 will move to the second position. If the plunger 45 is instead configured as a solenoid valve, the spring 48 may bias the plunger 45 into the first position, such that it will only move to the second position when the spring force is overcome by magnetic force provided by the activation of a coil winding.

In the first position as shown in FIG. 8A, a spring 48 is mounted above the plunger 45 in the chamber 43 and is compressed such that it provides a spring force to bias the plunger 45 towards the second position. The plunger 45 is retained in the first position however by the valve pyro-cutter wire 52 that is in tension until it is cut.

A venting path is provided between the outlet 42 and the external vent 47, allowing trapped gas to flow from the inflatable structure 20 through the chamber 43 and out the external vent 47.

In the second position as shown in FIG. 8B, the spring 48 is extended after the severing of the valve pyro-cutter wire 52. Reservoir seal 46 is engaged by the trigger 50 of the plunger 45, thus causing gas to be released from the gas reservoir 44 and travel out of the outlet 42 in order to inflate the inflatable structure 20. The venting path is then occluded by the plunger 45, with an annular vent seal 51 providing a seal that prevents gas from escaping through the external vent 47 during or subsequent to inflation.

Preferably the annular vent seal 51 is an o-ring. The annular vent seal 51 may at least partially lodge in the external vent 47 when the plunger is in the second position, thus blocking the external vent 47 directly, or it may seal against a wall section of the chamber 43 that is between the reservoir seal 46 and the external vent 47.

Figure 9:
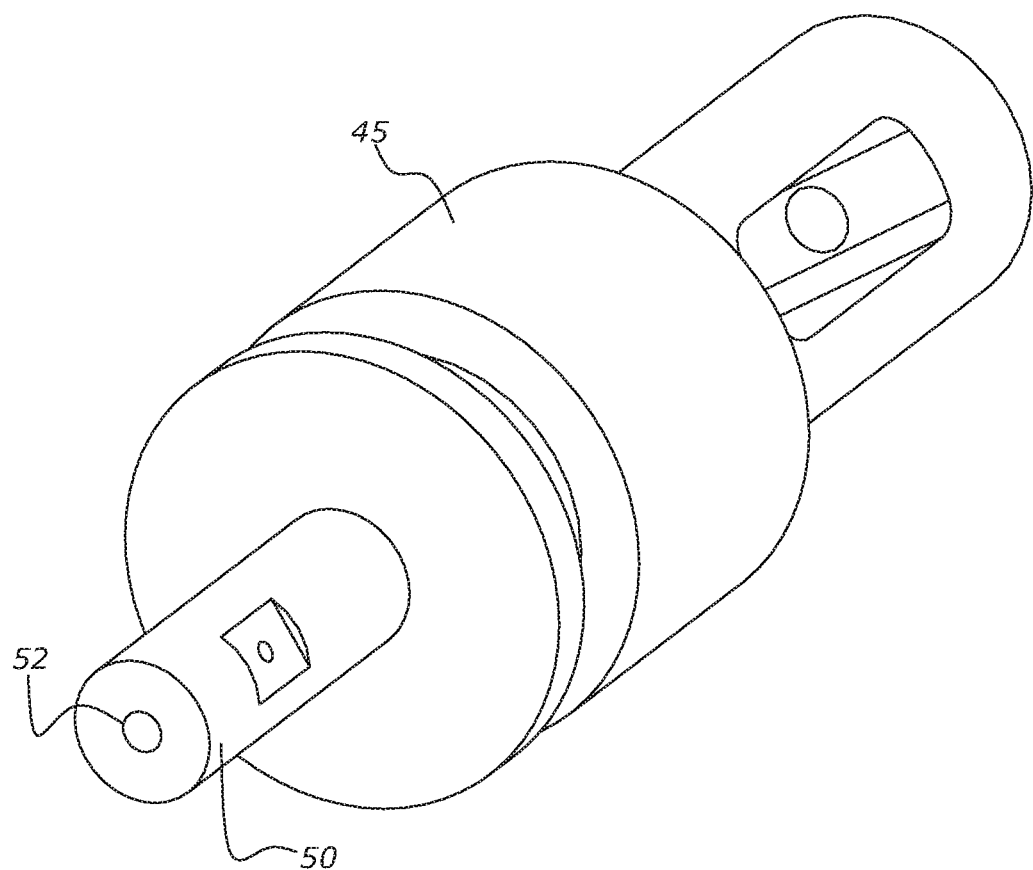
FIG. 9 shows a perspective view of the plunger.

As shown in FIG. 9, the trigger 50 of plunger 45 may contain a passage 52 that forms part of the inflation path for gas to flow from the gas reservoir 44 to the chamber 43. This may be useful with types of reservoir seals 46 where the trigger 50 would otherwise substantially block the flow of gas, and also as a flow limiter to moderate the inflation speed of the inflatable structure 20. The passage 52 may be provided from the center of trigger 50 to the side of trigger 50, or it may be provided as a cut-out in the side of the trigger 50.

Figure 10A:
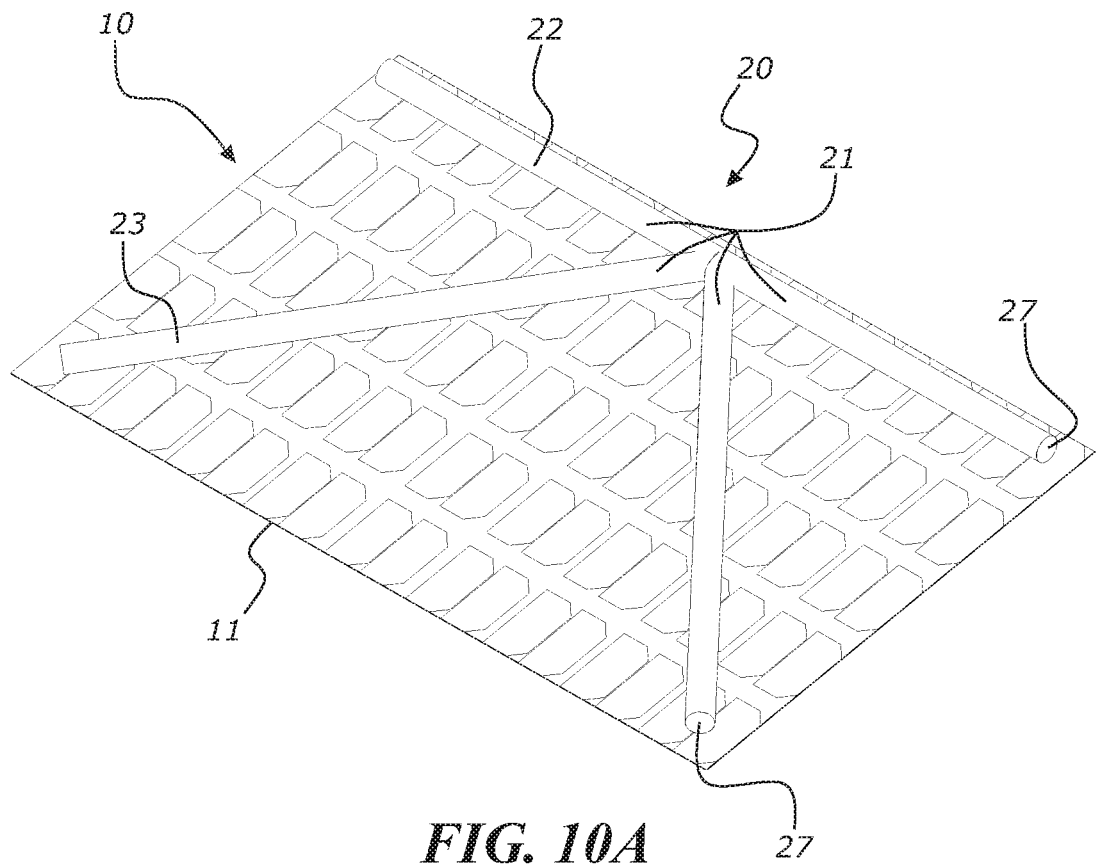
FIG. 10A shows a perspective view of the inflatable structure attached to the sheet.

As shown in FIG. 10A, in a first embodiment of the inflatable structure 20, terminal ends 27 of the ribs 21 are attached to the sheet 10 adjacent a sheet periphery 11 of the sheet 10. The number and position of ribs 21 is sufficient to maintain a desired shape of the sheet 10 in the deployed condition 3, which is preferably approximately planar. For a quadrilateral sheet 10 such as that shown, the terminal ends 27 are preferably attached in corners of the sheet 10, such that at least four ribs 21 are necessary to keep the quadrilateral sheet 10 approximately planar.

Preferably two of the four ribs 21 of each inflatable structure 20 are horizontal ribs 22 that extend in opposite directions along and parallel to an inner edge of the respective sheet 10 (i.e., an inner edge of the sheet periphery 11) such that the horizontal ribs 22 are collinear. The other two ribs 21 are diagonal ribs 23 that extend in diagonal directions toward far corners of the sheet 10. The ribs 21 have a junction 24 where the inflatable structure 20 is mounted to the inflation connector 72 on support panel 70. There may alternatively be some other number or arrangement of ribs 21 used, provided it is sufficient to support the sheet 10 such that it maintains an approximately planar shape.

As shown in FIGS. 10B-10E, various embodiments of inflatable structure 20 are possible with different numbers of ribs 21. In some embodiments, reinforcing ribs are provided that are also a type of inflatable rib 21, but may be of a smaller diameter than the primary ribs.

Figure 10B:
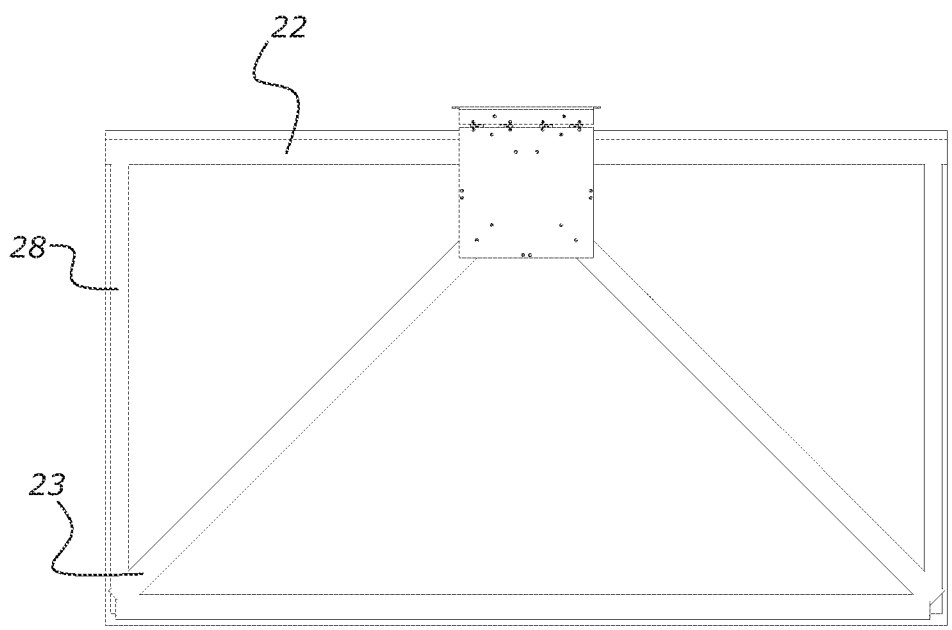
FIG. 10B shows a bottom view of an embodiment of the inflatable structure with peripheral reinforcing ribs.

As shown in FIG. 10B, in one embodiment of the inflatable structure 20 a plurality of peripheral reinforcing ribs 28 extends along edges of the sheet periphery 11 to join the terminal ends 27 of horizontal ribs 22 and diagonal ribs 23. The peripheral reinforcing ribs 28 thus provide additional stability to the sheet 10.

Figure 10C:
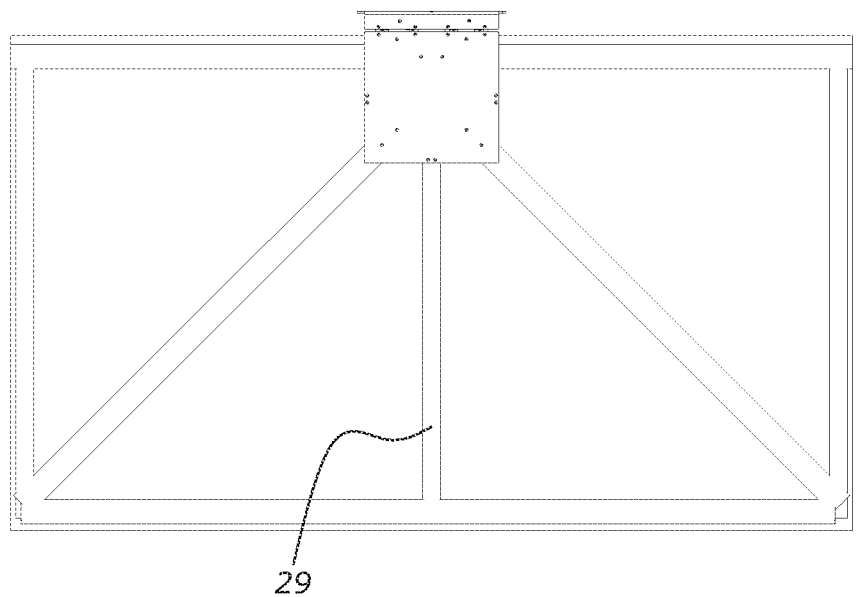
FIG. 10C shows a bottom view of an embodiment of the inflatable structure with peripheral and central reinforcing ribs.

As shown in FIG. 10C, in another embodiment of the inflatable structure 20 a central rib 29 is provided in addition to the peripheral reinforcing ribs 28 as described above. The central rib 29 extends orthogonally from the horizontal ribs 22 and in between the diagonal ribs 23. The central rib 20 then joins one of the peripheral ribs 28 at the periphery of the sheet 10. The central rib 29 provides additional stability to the sheet 10.

Figure 10D:
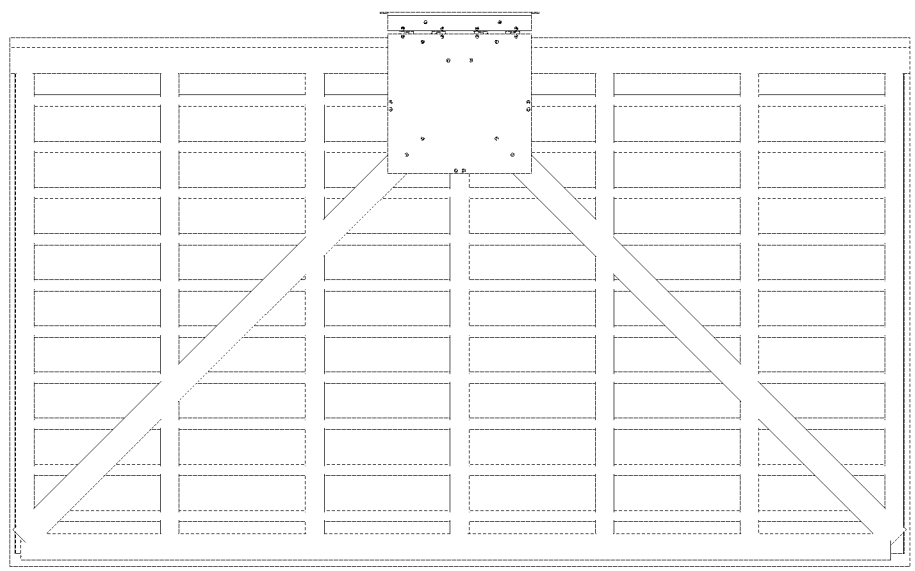
FIG. 10D shows a bottom view of an embodiment of the inflatable structure with a lattice of reinforcing ribs.

As shown in FIG. 10D, in another embodiment of the inflatable structure 20, a lattice of reinforcing ribs is provided across the area of the sheet 10 that intersect with each other, with the horizontal ribs 22, and with the diagonal ribs 23. The lattice may be in a grid format wherein the reinforcing ribs extend parallel the horizontal axes of the sheet 10, or alternatively at least some of the reinforcing ribs may stem outwards from other ribs 21 at a variety of angles. Preferably the lattice includes reinforcing ribs of a variety of sizes, with the objective of increasing the stability of the sheet 10 as much as possible while increasing the mass and stowed volume as little as possible. The lattice can thus be arranged such that larger ribs distribute load to smaller diameter ribs, which may in turn distribute load to even smaller diameter ribs. For example, the four primary ribs 21 might distribute load to seven medium-sized reinforcing ribs, which in turn distribute load to numerous small-sized reinforcing ribs. The lattice of reinforcing ribs provides an especially high degree of additional stability to the sheet 10.

Figure 10E:
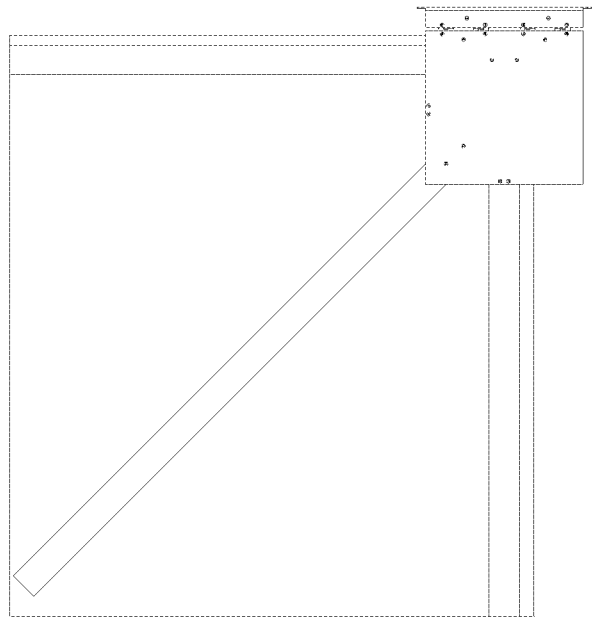
FIG. 10E shows a bottom view of a half-size embodiment of the inflatable structure.

As shown in FIG. 10E, in another embodiment of the inflatable structure 20, the sheet 10 is "half-size" such that the junction 24 of the ribs 21 is at a corner of the sheet 10 rather than in the middle of one edge of the sheet periphery 11. Thus, the horizontal ribs 22 are orthogonal rather than extending in opposite, collinear directions, and there is only a single diagonal rib 22.

When ribs 21 are deflated and the sheet 10 is folded in the stowed condition 2, the terminal ends 27 are within a support panel periphery 75 of the support panel 70. When the ribs 21 are inflated the terminal ends 27 are located outwardly of the support panel 70, the ribs 21 having expanded the sheet 10 into its final shape in the deployed condition 3. The sheet periphery 11 thus encompasses a greater area than the support panel periphery 75 in the deployed condition 3.

Support panel 70 is preferably parallel to the sheet 10 in the deployed condition 3, such that such that the support panel 70 supports the ribs 21 in keeping the sheet 10 approximately planar. The panel 70 may contact the ribs 21 along at least a portion of their length and prevent undesirable bending or deformation at least to some extent.

The ribs 21 are preferably made from a non-elastic material so as to reduce the chance of deformations that may affect the shape of sheet 10.

Figure 11A:
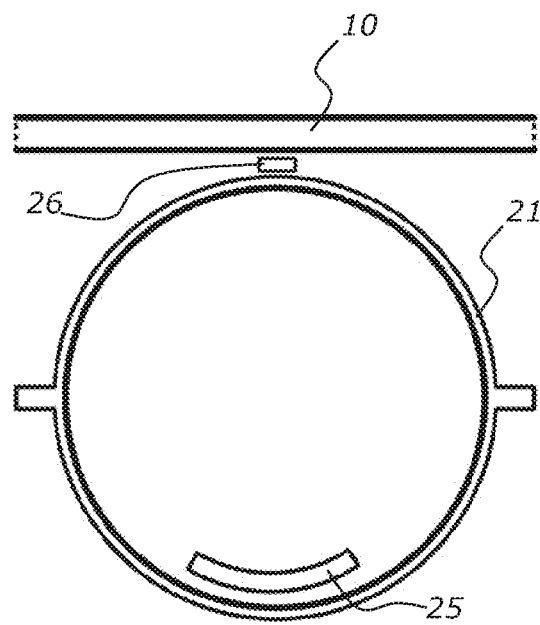
FIG. 11A shows a longitudinal cross-section view of a rib of the inflatable structure attached to the sheet by adhesive.

As shown in FIG. 11A, the ribs 21 are preferably attached to the sheet 10 using a strip of adhesive 26 along a top surface. Preferably, the adhesive 26 is double-sided sticky tape. Although adhesive 26 can maintain integrity when stowed and during deployment, the adhesion may degrade during temperature cycles experienced after deployment.

Figure 11B:
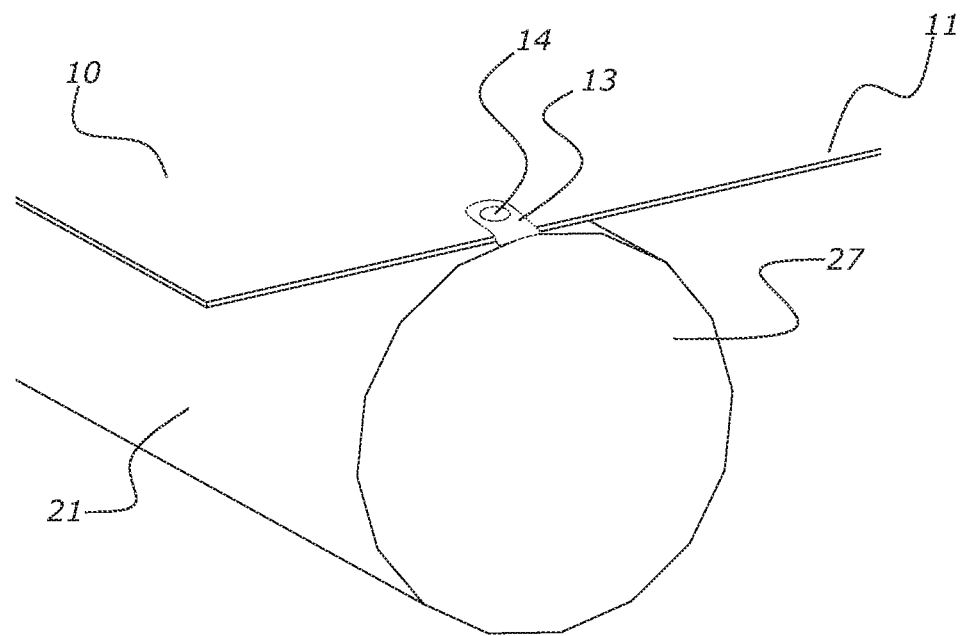
FIG. 11B shows a perspective view of a terminal end of a rib of the inflatable structure attached to the sheet by a heat-sealed tab.

As shown in FIG. 11B, tabs 13 are therefore preferably also connected at the terminal end 27 of each rib 21. The tabs 13 wrap around the sheet 10 and are heat sealed through holes 14 punched in the sheet 10. The tabs 13 can therefore maintain the connection between the ribs 21 and the sheet 10 even after the adhesive 26 has degraded.

Figure 11C:
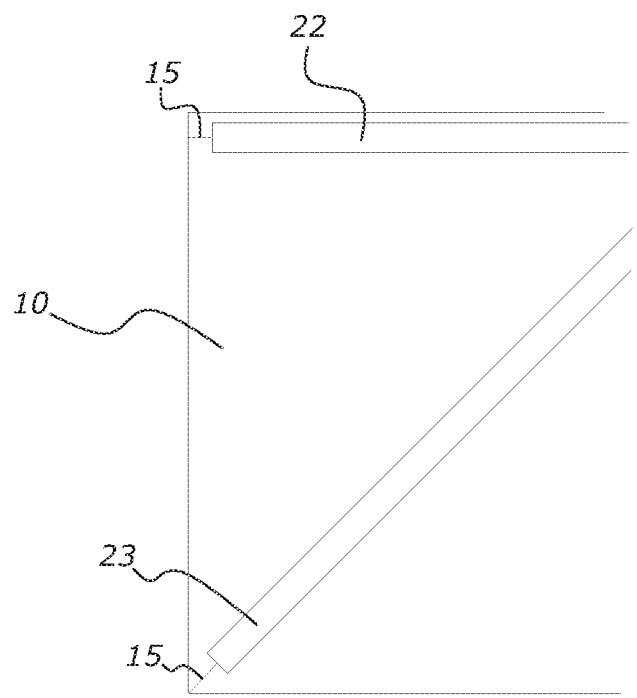
FIG. 11C shows a bottom view of two ribs of the inflatable structure attached to and tensioning the sheet with elastic strings.

As shown in FIG. 11C, as an alternative to adhesive 26 the ribs 21 may be attached to the sheet 10 in a manner which tensions the sheet 10, thereby increasing the stiffness of the sheet 10 and reducing undesirable warping or other movement. For example, the sheet periphery 11 (preferably near the corners) may be connected to the terminal ends 27 of the ribs 21 by elastic connectors 16 (for example elastic string), such that the elastic connectors 16 tension the sheet 10 in the deployed condition. Alternatively, the ribs 21 may be offset to create tension. Tabs 13 as described above could also be made from an elastic material to facilitate tensioning, however if adhesive 26 is used it would need to fully degrade before the rib 21 could be properly held in tension.

A flexible filler material 25, for example paper, is preferably used to line each rib 21 to improve the flow rate of gas when the inflatable structure 20 is folded in the stowed condition 2. The flexible filler material 25 assists in lessening the tightness of internal constrictions in the folded ribs 21, thus providing an improved pathway for gas flow. This prevents the integrity of the inflatable structure 20 from becoming compromised during inflation due to pressure building too quickly in one section, or prior to deployment due to pockets of trapped gas building in gauge pressure during launch.

To manufacture the ribs 21, a preferred method is to take two flat sheets of material (any suitably flexible and non-porous material could be used) and cut them to the shape of the desired rib layout, thereby forming a pair of rib templates. The rib templates can then be heat sealed together along the edges 15 to form the inflatable ribs 21 (as shown in FIG. 11A). Thus, all of the ribs 21 are formed and connected simultaneously. The ribs 21 can then be attached to the sheet 10. Flexible filler material 25 is preferably inserted between the flat sheets prior to heat sealing the sheets together, such that it will be enclosed within them.

Figure 12:
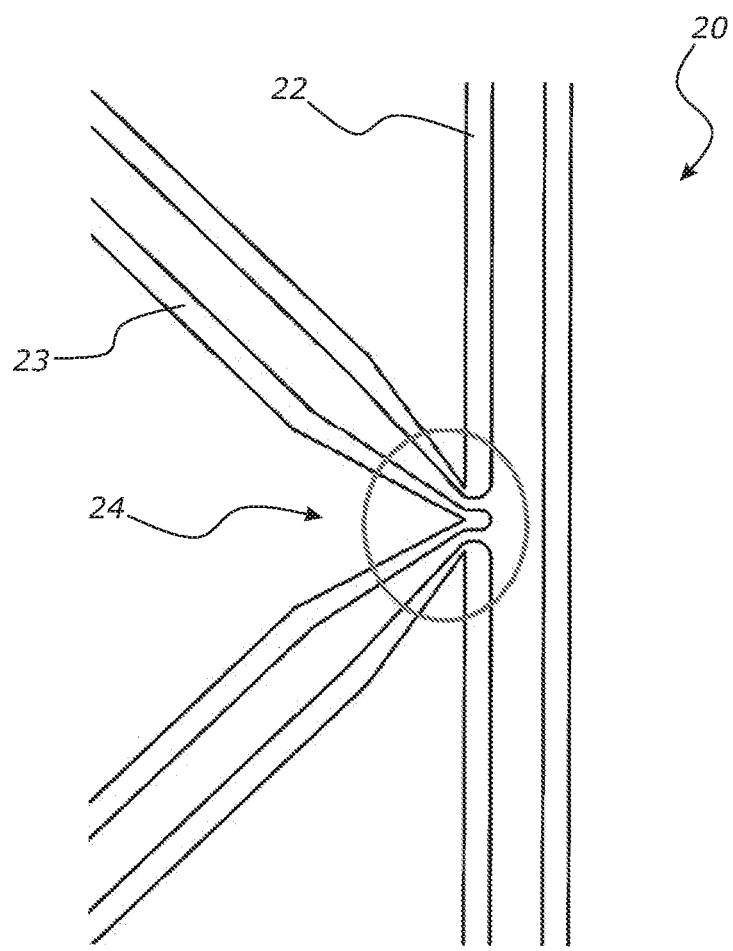
FIG. 12 shows a top cross-sectional view of the inflatable structure at the junction of the ribs.

As shown in FIG. 12, the diagonal ribs 23 of the inflatable structure 20 preferably constrict near the junction 24 of the ribs 21. The constrictions assist in preventing buckling at the junction 24 when inflated in the deployed condition 3, as buckling would cause the diagonal ribs 23 to apply torques to the sheet 10. Without constrictions, buckling is especially likely at the junction 24 if the ribs 21 have been manufactured by the preferred method of heat-sealing flat sheets together as described above. Reduction or elimination of such torques improves the stability of the inflatable structure 20 and reduces distortions in the sheet 10. A thicker filler material 25 is preferably used at the junction 24 in order to improve the flow rate of gas through the constriction when folded in the stowed condition 2.

The parallel ribs 22 that extend in opposite directions may in fact be one continuous tube except for the junction with the diagonal ribs 21.

Figure 13:
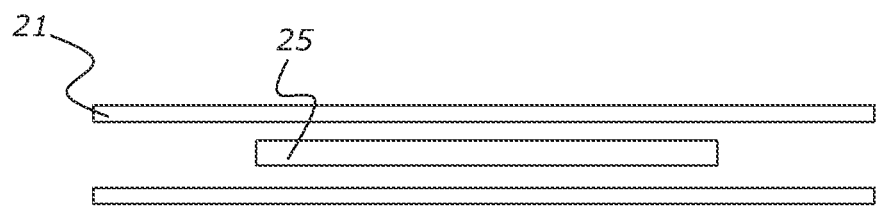
FIG. 13 shows a cross-sectional view of the skin of the inflatable structure with a filler material.
Figure 14:
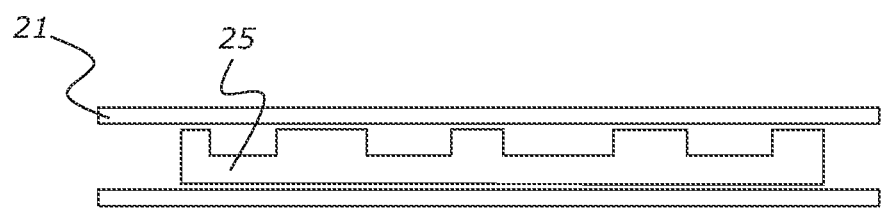
FIG. 14 shows a cross-sectional view of the skin of the inflatable structure with a ridged filler material.

As shown in FIGS. 13-14, the flexible filler material 25 used to line the ribs 21 may have a shape adapted to improve the flow rate of gas when the ribs 21 are folded. The shape may depend on the type of flexible filler material 25 that is used. Preferably, a porous material such as paper is used such that gas can pass through the pores without being completely obstructed. For a porous material, a simple shape such as shown in FIG. 13 may be adequate. However, non-porous materials may also be used as filler material 25, in which case gas must pass around the filler material 25. To facilitate an unobstructed gas pathway, non-porous filler materials 25 are preferably shaped with features such as ridges as shown in FIG. 13. The gaps between ridges can provide a gas pathway when the ribs 21 are folded.

As shown in FIGS. 15A-15C, when the inflatable deployment system 1 is in the stowed condition 2 the sheet 10 is preferably concertina/accordion folded in two horizontal axes about approximately square sections. Preferably solar cells 12 as presented on the sheet 10 are also approximately square such that the folding is done about the solar cells 12, the material of sheet 10 effectively acting as live hinging about each cell 12. Thus, when the inflatable structure 20 begins to deploy, the area of the folded sheet 10 when viewed from the top (as shown in FIG. 15C) is that of a single square section.

Figure 15D:
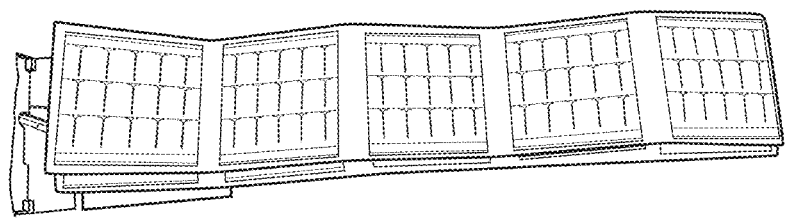
FIG. 15D shows a top view of the sheet unfolded in a first horizontal axis.
Figure 15E:
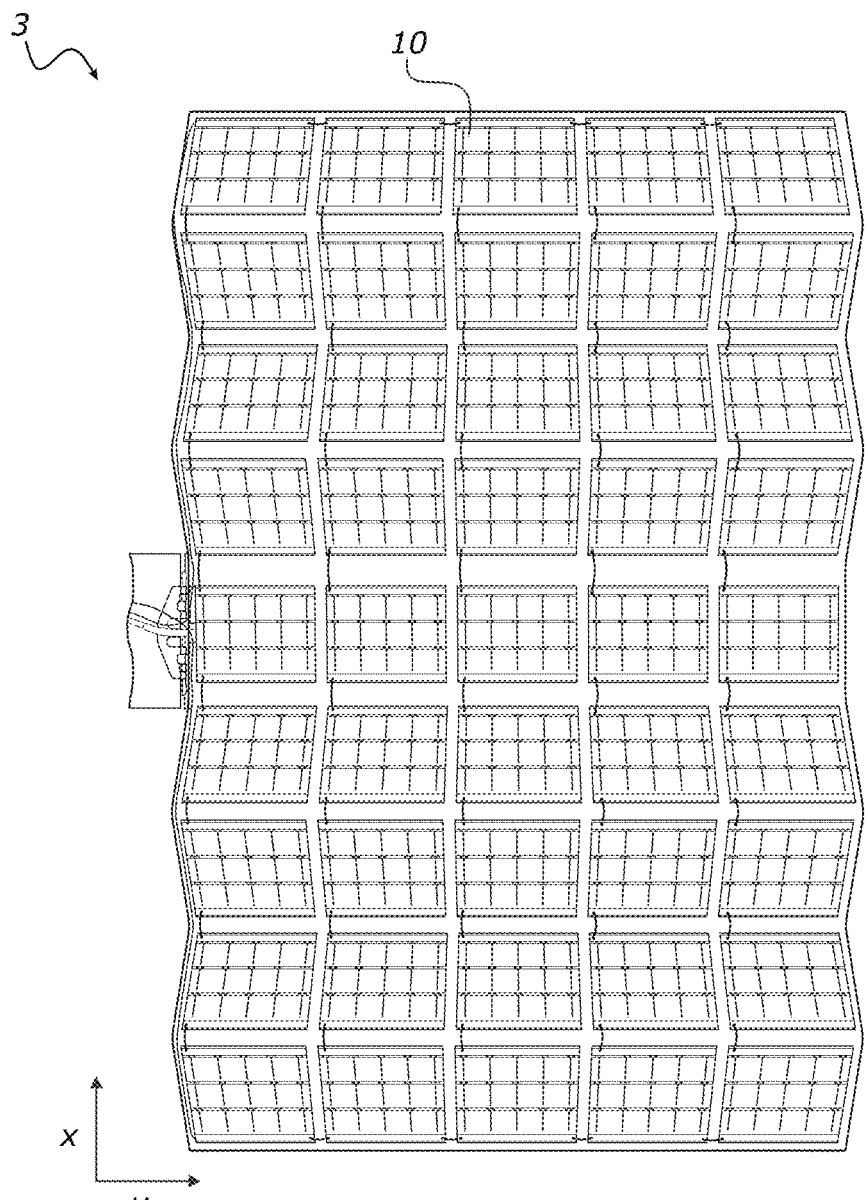
FIG. 15E shows a top view of the sheet unfolded in two horizontal axes.

When folding the sheet 10 prior to stowing, the sheet 10 is preferably folded along the longer dimension first, i.e., along the x-axis as shown in FIG. 15E. Folds are subsequently made along the shorter dimension, i.e., along the y-axis. The folding sequence will inherently influence the unfolding sequence during deployment.

The folds along the x-axis are preferably interlocked on alternating sides, i.e., the folding process preferably begins with a column of square sections adjacent the central column being folded over the central column in the x direction. Then, a column of square sections adjacent the other side of the central column is folded over the central column in the negative x direction. This process is repeated until x-axis folding is completed.

Optionally, the inflatable structure 20 can also be subjected to active gas extraction as part of the folding or stowing process. This could be by application of vacuum or partial vacuum either directly to an opening in the inflatable ribs 21, or via the external vent 47 after connection to the inflation system 40. Active gas extraction can help to ensure that there are no pockets of trapped gas in the folds, and enable more compact folding. Filler material 25 is highly desirable to ensure that application of vacuum does not damage the inflatable ribs 21 during this process.

As shown in FIGS. 15D-15E, concertina folding as described above results in the sheet 10 beginning to unfold primarily along the y-axis as the inflatable structure 20 inflates. As inflation continues, the sheet 10 will unfold in the x-axis as well until the deployed condition 3 is reached. It will be appreciated that inflation of the diagonal ribs 23 will cause the sheet 10 to unfold in both horizontal axes simultaneously to some extent. Thus, the actual unfolding sequence may not necessarily reflect the simplified representation as depicted in FIGS. 15D-15E.

As shown in FIG. 15E, in one embodiment the sheet 10 comprises a 9×5 grid of square sections. Preferably each section presents a solar cell 12. Thus, in unfolding from the stowed condition 2 to the deployed condition 3, the area (specifically the cross-sectional area in the normal direction) expands by a factor of 45. The ratio of the deployed surface area to the stowed volume of the sheet 10 is also relevant to the effectiveness of the inflatable deployment system 1. The surface area to volume ratio may depend on the thickness of the sheet 10 and of the uninflated ribs 21, as thinner sheets 10 can achieve a better ratio due to more compact folding. As shown in FIG. 15A, the stowed thickness of the folded sheet 10 is preferably less than half of the side length of each square section. Thus, the ratio is preferably at least 900 m$^2$ when deployed per m$^3$ when stowed.

In one exemplary embodiment of the inflatable structure 20, the sheet 10 presents an area of approximately 0.8 m×0.5 m when in the deployed condition 3. The thickness of the sheet 10, including solar cells 12, is approximately 0.5 mm. When in the stowed condition 2, the thickness of the folded sheet 10 is approximately 30 mm. Folding imperfections and the thickness of the uninflated ribs 21 are limiting factors in minimizing the stowed thickness towards its theoretical minimum.

It will be appreciated that many other folding configurations are possible for the sheet 10, which may involve non-square sections made by the folding and result in different unfolding sequences. A compact volume when folded and a fit-for-purpose shape when unfolded are key considerations for selection of folding configuration.

The inflatable deployment system 1 can be mounted to different types of spacecraft 4 in various configurations and in various ways.

Figure 16A:
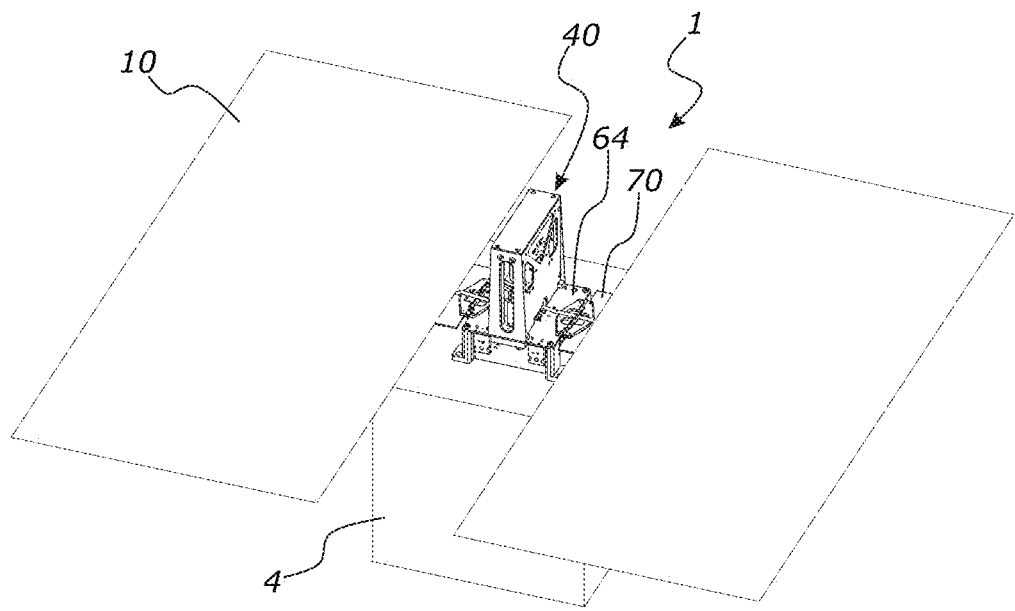
FIG. 16A shows a perspective view of the inflatable deployment system mounted to a spacecraft as a single unit.

As shown in FIG. 16A, the entirety of the inflatable deployment system 1 may be mounted as a single unit on any suitable surface of a spacecraft 4. Preferably, it is mounted as a unit having two inflatable structures 20 that deploy in opposite directions. Thus, the inflatable structures 20 are provided on opposing sides of a central point of the inflatable deployment system 1, for example the central housing 61. The unit may be mounted to the spacecraft 4 via mounting points 62 of the base unit 60 or the platform 64.

Figure 16B:
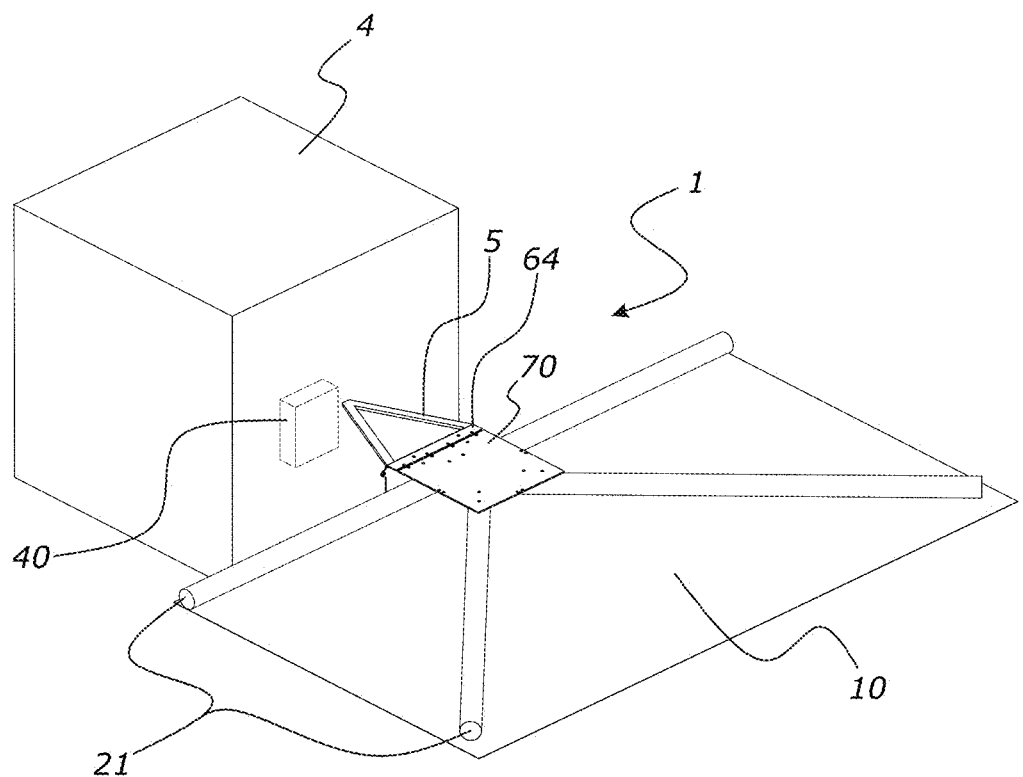
FIG. 16B shows a perspective view of the deployment system partially mounted to a spacecraft at the end of a boom.

As shown in FIG. 16B, the inflatable structure 20, the support panel 70, and the platform 64 may alternatively be mounted at the end of a boom 5 extending from the spacecraft 4. The boom 5 may be actuated by the spacecraft such that it extends or pivots away from the spacecraft as part of a deployment sequence in orbit. The electronics module 30 and/or the inflation system 40 could be mounted directly to or otherwise integrated with the spacecraft 4, being connected to the sheet 10 and the inflatable structure 20 by inflatable tubes 20 and/or electrical conduits running along the boom 5. Alternatively, the electronic module 30 and/or the inflation system 40 could be provided at the end of the boom 5 mounted to the platform 64.

Mounting at the end of a boom 5 may be best suited to a single inflatable structure 20 as depicted. A second inflatable structure 20 may be provided on the other side of the spacecraft 4 mounted at the end of a secondary boom 5. The inflatable structures 20 could be part of the same inflatable deployment system 1, or they may be partially or fully independent. However, if the boom 5 is sufficiently long then the inflatable deployment system 1 may comprise additional inflatable structures 20 and sheets 10 mounted to deploy at different positions on the boom 5.

Preferably the inflatable deployment system 1 can be mounted to spacecraft 4 classified as microsatellites, and in particular to those following the cubesat standard. Preferably the spacecraft 4 is at least an 8 kg satellite, corresponding approximately to a 6 U satellite by the cubesat standard. The base unit 60 or the platform 64 may provide mounting points 62 that allow the inflatable deployment system to be mounted to a microsatellite as a single unit. The platform 64 or the base unit 60 may have an approximately 10 cm×10 cm area such that the inflatable deployment system 1 is sized in accordance with the cubesat standard. This sizing allows the inflatable deployment system 1 to act as a standardized cubesat module that can be easily connected to a cubesat spacecraft 4.

The inflatable deployment system 1 can preferably also be mounted to larger spacecraft 4, for example those between 40-500 kg that are not considered microsatellites/cubesats. When the sheets 10 act as a solar panel, larger satellites may require larger sheets 10 or a greater number of sheets 10 to provide sufficient power. For example, solar cells 12 providing 200 W of power may be sufficient for satellites in the 40-200 kg range, but 400 W or more may be preferable for spacecraft around 80-400 kg depending on the functions of the spacecraft.

The present inflatable deployment system 1 could also be incorporated into a spacecraft 4 in alternative ways. For example, parts of the inflatable deployment system 1 may be built into the spacecraft 4 and integrated with its electronics rather than being a separable module that is mounted via mounting points 62 or being fully self-contained. Power may instead be derived from other parts of the spacecraft 4. Other suitable mounting configurations could also be used.

A sufficiently large spacecraft 4 could use multiple inflatable deployment systems 1 mounted or otherwise built into it.

It will be appreciated that the inflatable deployment system 1 has other potential applications besides use with or on a spacecraft 4. For example, it could be used to deploy inflatable structures 20 for use with static infrastructure on the surface of moons or other planets, for example habitats or refueling stations. It may also be suitable for terrestrial applications such as disaster relief, military use, survival, or solar powered high-altitude aircraft. For use within atmosphere, i.e., not in orbit, the gas source 44 must provide gas at a higher pressure as appropriate to inflate the inflatable structure 20.

The inflatable deployment system 1 provides several advantages made possible by the use of inflatable structures 20 having inflatable ribs 21 that support the sheet 10. Several features are provided to address the typical problems that would otherwise arise from the use of such a system in space.

The ratio of surface area of the sheets 10 in the deployed condition 3 to the volume of the inflatable deployment system 1 in the stowed condition 2 is many times larger than what may be possible for comparable solar panel deployment units. This means that much greater solar power generation can be achieved from a given solar panel deployment module size. This could provide satellites with greatly increased power, or help to reduce the necessary payload size for achieving a given amount of power.

Because the entire sheet 10 is supported by inflatable ribs 21, the weight of the system is also considerably reduced compared to that of a solar panel supported by rigid mechanical means. Launch providers often charge per unit of mass, so launch costs are lower for a given solar panel area.

The ability to maintain a desired shape of sheet 10, preferably planar and quadrilateral, is improved by the provision of support panels 70 which are attached to the inflatable structures 20 and by the constriction of the ribs 21 near the junction 24 to reduce buckling at the junction 24. The use of non-elastic material for the ribs 21 may also assist in maintaining the desired shape of sheet 10.

One practical implementation issue for inflatables in space is related to the pressure change that occurs as altitude increases during launch, with the exterior pressure becoming effectively vacuum once orbit is achieved and the payload is deployed. Some pockets of gas will inevitably remain trapped in an inflatable structure even when it is deflated, folded and stowed prior to launch. The gauge pressure of this trapped gas increases with altitude, which may put stress on a localized area of the inflatable structure. This stress may be sufficient to compromise the skin, thus causing leaking when inflation is attempted and preventing proper deployment. The inflatable deployment system 1 of the present disclosure addresses these issues in two key ways.

Firstly, an external vent 47 is provided in the chamber 43 such that gas has a venting path to escape from each inflatable structure 20 as altitude increases. This limits the gauge pressure build-up of gas in the inflatable structure 20, as a venting path is provided for equalization with the dropping atmospheric pressure. The external vent 47 is subsequently occluded when transitioning to the deployed condition 3.

Secondly, a filler material 25 is used to line each rib 21 of the inflatable structures 20. Even with a venting path to the external environment through the external vent 47, pockets of trapped gas may remain in the inflatable structure 20 due to the folds cutting off flow. The use of a filler material 25 guarantees some minimum flow rate through all parts of the inflatable structure 20, preventing localized build-ups of gauge pressure in trapped gas. The filler material 25 also prevents such build-ups during inflation of the inflatable structure 20, as the introduced gas will be able to reach the extremities of the ribs 21 without excessive build-up near the inflation connector 72.

The combination of external vent 47 and filler material 25 also allows gas to be actively extracted from the inflatable ribs 21 by application of vacuum or partial vacuum prior to launch. Active gas extraction could also be applied during the folding or stowing process, and not necessarily via the external vent 47. This process can help to ensure that no pockets of trapped gas remain and enable more compact folding.

The external vent 47 also has particular synergy with the provision of a passage 52 in the trigger 50 of plunger 45, as the passage 52 allows differing flow rate restrictions between the venting path and the inflation path. The passage 52 can provide a restriction that moderates the flow rate of gas through the inflation path to ensure controlled inflation without sudden pressure build-up. The venting path has no such restriction and thus gas can escape more freely from the inflatable structure 20 prior to deployment.

It will be appreciated that the inflatable deployment system 1 that is herein described can be adapted and be made suitable for use as or with other inflatable structures not just for solar panels that has been the predominant application herein described.

To those skilled in the art to which the disclosure relates, many changes in construction and widely differing embodiments and applications of the disclosure will suggest themselves without departing from the scope of the disclosure as defined in the appended claims.

This disclosure may also be said broadly to consist in the parts, elements and features referred to or indicated in the specification of the application, individually or collectively, and any or all combinations of any two or more of said parts, elements or features, and where specific integers are mentioned herein which have known equivalents in the art to which this disclosure relates, such known equivalents are deemed to be incorporated herein as if individually set forth.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An inflatable deployment system suitable for use with or on a spacecraft, the inflatable deployment system comprising:
    an inflatable structure comprising a plurality of inflatable ribs attached to a flexible and foldable sheet;
    an electronics module that is configured to trigger the transformation of the inflatable deployment system from a stowed condition in which the plurality of ribs are deflated and the inflatable structure is folded, to a deployed condition in which the plurality of ribs are inflated and the sheet is caused by the ribs to form an approximately planar surface;
    a support panel for the inflatable structure, the inflatable structure being secured to the support panel in a manner such that when the ribs are deflated the inflatable structure is retained by/to the support panel and when the ribs are inflated the ribs project beyond the support panel to extend in different directions along the sheet, the support panel supporting the ribs along at least a portion of their length and being parallel to the sheet in the deployed condition such that the support panel supports the ribs in keeping the sheet approximately planar; and
    an inflation system comprising:
        a gas source; and
        a flow control mechanism to control flow of gas to the ribs and comprising an outlet in fluid communication with the inflatable structure, wherein the flow control mechanism is configured to allow the ribs to be inflated by gas from the gas source when triggered by the electronics module;
    wherein the support panel is a hinged panel held in an initial position in the stowed condition and that moves to a final position in the deployed condition.

2. The inflatable deployment system of claim 1, wherein the flow control mechanism further comprises an external vent that provides a venting path for trapped gas in the ribs to escape from the inflatable structure when in the stowed condition.

3. The inflatable deployment system of claim 1, wherein the hinged panel retains the inflatable structure in a folded configuration when in the initial position, and wherein the hinged panel is freed to move when triggered by the electronics module and allows unfolding of the inflatable structure when in the final position.

4. The inflatable deployment system of claim 1, wherein the hinged panel has a hinge comprising a torsional spring that biases the hinged panel towards the final position.

5. The inflatable deployment system of claim 1, wherein the hinged panel is held in place in the stowed condition by one or more panel pyro-cutter wires, and wherein the electronics module is configured to trigger the freeing of the hinged panel by severing the one or more panel pyro-cutter wires.

6. The inflatable deployment system of claim 5, wherein all pyro-cutter wires pass through a plurality of pyro-cutters controlled by the electronics module, and wherein the pyro-cutters beyond the first are redundant backups to improve the chance of successful deployment.

7. The inflatable deployment system of claim 1, wherein at least some of the plurality of inflatable ribs extend outwardly from a junction at which the ribs meet, and wherein the junction is located at a sheet periphery of the sheet.

8. The inflatable deployment system of claim 7, wherein the junction is located centrally along an inner edge of the sheet periphery.

9. The inflatable deployment system of claim 8, wherein the inflatable ribs include two horizontal ribs that extend from the junction in opposite directions along the inner edge of the sheet periphery, and two diagonal ribs that extend from the junction towards far corners of the sheet periphery.

10. The inflatable deployment system of claim 9, wherein the inflatable structure further comprises reinforcing ribs that join or intersect with the horizontal ribs and the diagonal ribs.

11. The inflatable deployment system of claim 7, wherein diagonal ribs that connect to the junction are constricted near the junction.

12. The inflatable deployment system of claim 7, wherein the junction is mounted to the support panel.

13. The inflatable deployment system of claim 7, wherein a terminal end of each of the ribs is attached to the sheet adjacent the sheet periphery, wherein the terminal ends are within a support panel periphery of the support panel in the stowed condition, and wherein upon inflation of the ribs each terminal end is located outwardly of the support panel, the ribs having expanded the sheet such that the sheet periphery encompasses a greater area than the support panel periphery in the deployed condition.

14. The inflatable deployment system of claim 1, wherein the inflatable deployment system comprises two inflatable structures having separate support panels, the inflatable structures being provided on opposing sides of a central point of the inflatable deployment system.

15. The inflatable deployment system of claim 1, wherein the plurality of inflatable ribs contain a filler material extending along the length of each of the ribs, the filler material being porous or ridged such that gas can flow through or around the filler material when the inflatable structure is folded in the stowed condition.

16. The inflatable deployment system of claim 1, wherein the sheet is quadrilateral in the deployed condition.

17. The inflatable deployment system of claim 1, wherein the sheet acts as a solar panel and presents a plurality of solar cells.

18. A method of manufacturing an inflatable deployment system suitable for use with or on a spacecraft, the method comprising the steps of:
   providing the inflatable deployment system of claim 1 by:
   a) cutting two flat sheets of material into the desired shape of the inflatable ribs, thereby forming a pair of rib templates;
   b) heat sealing the rib templates together along edges to form the inflatable ribs; and
   c) attaching the inflatable ribs to the flexible and foldable sheet.

* * * * *